(12) United States Patent
Schwarz et al.

(10) Patent No.: US 11,109,066 B2
(45) Date of Patent: *Aug. 31, 2021

(54) ENCODING AND DECODING OF VOLUMETRIC VIDEO

(71) Applicant: Nokia Technologies Oy, Espoo (FI)

(72) Inventors: Sebastian Schwarz, Unterhaching (DE); Miska Hannuksela, Tampere (FI); Alireza Aminlou, Tampere (FI); Emre Aksu, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/634,952

(22) PCT Filed: Aug. 13, 2018

(86) PCT No.: PCT/FI2018/050582
§ 371 (c)(1),
(2) Date: Jan. 29, 2020

(87) PCT Pub. No.: WO2019/034808
PCT Pub. Date: Feb. 21, 2019

(65) Prior Publication Data
US 2020/0244993 A1 Jul. 30, 2020

(30) Foreign Application Priority Data
Aug. 15, 2017 (FI) .................................... 20175730

(51) Int. Cl.
*H04N 19/597* (2014.01)
*G06T 7/593* (2017.01)
(Continued)

(52) U.S. Cl.
CPC .......... *H04N 19/597* (2014.11); *G06T 7/593* (2017.01); *G06T 15/20* (2013.01); *H04N 13/117* (2018.05);
(Continued)

(58) Field of Classification Search
USPC .................................................. 375/240.16
See application file for complete search history.

(56) References Cited

U.S. PATENT DOCUMENTS

| 5,764,237 A | 6/1998 | Kaneko |
| 5,850,352 A | 12/1998 | Moezzi et al. ............ 364/514 A |

(Continued)

FOREIGN PATENT DOCUMENTS

| WO | 2015/172227 A1 | 11/2015 |
| WO | 2016/003340 A1 | 1/2016 |

(Continued)

OTHER PUBLICATIONS

Mekuria et al., "Design, Implementation and Evaluation of a Point Cloud Codec for Tele-Immersive Video", IEEE Transactions on Circuits and Systems for Video Technology, vol. 27, No. 4, Apr. 2017, pp. 828-842.

(Continued)

*Primary Examiner* — Behrooz M Senfi
(74) *Attorney, Agent, or Firm* — Harrington & Smith

(57) ABSTRACT

There are provided methods, apparatuses, systems and computer program products for coding volumetric video, where a first texture picture is coded, the first texture picture comprising a first projection of texture data of a first source volume of a digital scene model, the scene model comprising a number of further source volumes, the first projection being from the first source volume to a first projection surface, a first geometry picture is coded, the first geometry picture representing a mapping of the first projection surface (Continued)

to the first source volume, and first projection geometry information of the first projection is coded, the first projection geometry information comprising information of position of the first projection surface in the scene model.

20 Claims, 9 Drawing Sheets

(51) Int. Cl.
H04N 13/376 (2018.01)
H04N 13/383 (2018.01)
H04N 13/117 (2018.01)
H04N 13/341 (2018.01)
H04N 13/194 (2018.01)
H04N 13/161 (2018.01)
H04N 13/243 (2018.01)
G06T 15/20 (2011.01)

(52) U.S. Cl.
CPC ......... *H04N 13/161* (2018.05); *H04N 13/194* (2018.05); *H04N 13/243* (2018.05); *H04N 13/341* (2018.05); *H04N 13/376* (2018.05); *H04N 13/383* (2018.05)

(56) References Cited

U.S. PATENT DOCUMENTS

| | | | |
|---|---|---|---|
| 5,920,320 A * | 7/1999 | Shimizu | G06T 17/00 345/422 |
| 7,430,312 B2 | 9/2008 | Gu | |
| 7,483,590 B2 | 1/2009 | Nielsen et al. | |
| 9,177,220 B2 | 11/2015 | Givon | |
| 9,256,980 B2 | 2/2016 | Kirk | |
| 9,317,970 B2 | 4/2016 | Beeler et al. | |
| 2013/0033586 A1 | 2/2013 | Hulyalkar | |
| 2013/0101017 A1 | 4/2013 | De Vleeschauwer et al. | |
| 2013/0321396 A1* | 12/2013 | Kirk | H04N 13/117 345/419 |
| 2013/0321564 A1 | 12/2013 | Smith et al. | |
| 2014/0063024 A1 | 3/2014 | Zhang et al. | |
| 2014/0184596 A1* | 7/2014 | Unger | G06T 15/04 345/423 |
| 2015/0201176 A1 | 7/2015 | Graziosi et al. | 13/29 |
| 2015/0208052 A1* | 7/2015 | Kobiki | H04N 9/3182 348/578 |
| 2015/0228106 A1* | 8/2015 | Laksono | G06T 15/04 345/419 |
| 2016/0065930 A1 | 3/2016 | Chandra et al. | |
| 2016/0112704 A1 | 4/2016 | Grange et al. | |
| 2016/0112713 A1 | 4/2016 | Russell | |
| 2017/0094262 A1* | 3/2017 | Peterson | G06T 19/006 |
| 2017/0228940 A1 | 8/2017 | Kutliroff | |
| 2017/0310945 A1* | 10/2017 | Juang | G06T 19/006 |
| 2020/0026166 A1* | 1/2020 | Karasawa | H04N 9/3147 |
| 2020/0029092 A1* | 1/2020 | Rath | H04N 19/172 |

FOREIGN PATENT DOCUMENTS

| | | |
|---|---|---|
| WO | 2018/109265 A1 | 6/2018 |
| WO | 2018/172614 A1 | 9/2018 |
| WO | 2019/034808 A1 | 2/2019 |

OTHER PUBLICATIONS

"Google/Draco", GitHub, Retrieved on Dec. 19, 2019, Webpage available at: https://github.com/google/draco.

Mamou et al., "FAMC: The MPEG-4 Standard for Animated Mesh Compression", 15th IEEE International Conference on Image Processing, Oct. 12-15, 2008, pp. 2676-2679.

Peng et al., "Acquiring Human Skeleton Proportions from Monocular Images without Posture Estimation", 10th International Conference on Control, Automation, Robotics and Vision, Dec. 17-20, 2008, pp. 2250-2255.

Urunuela et al., "2D Silhouette and 3D Skeletal Models for Human Detection and Tracking", Proceedings of the 17th International Conference on Pattern Recognition, Aug. 26, 2004, 4 pages.

"Call for Proposals for Point Cloud Compression V2", ISO/IEC JTC1/SC29/WG11 MPEG2017/N16763, Apr. 2017, 21 pages.

Kim et al. "Compression Efficiency Evaluation for Virtual Reality Videos by Projection Scheme" IEIE Transactions on Smart Processing and Computing, vol. 6, No. 2, Apr. 2017, pp. 102-108.

Karpinsky et al., "3D Video Compression with the H.264 Codec", Three-Dimensional Image Processing (3DIP) and Applications II, Proc. of SPIE—IS&T Electronic Imaging, vol. 8290, Jan. 2012, pp. 1-8.

"Information Technology—Dynamic Adaptive Streaming Over HTTP (DASH)—Part 1: Media Presentation Description and Segment Formats", ISO/IEC 23009-1, May 15, 2014, 152 pages.

Office action received for corresponding Finnish Patent Application No. 20175730, dated Apr. 13, 2018, 7 pages.

International Search Report and Written Opinion received for corresponding Patent Cooperation Treaty Application No. PCT/FI2018/050582, dated Dec. 12, 2018, 15 pages.

Wang et al., "Accurate Full Body Scanning from a Single Fixed 3D Camera", Second International Conference on 3D Imaging, Modeling, Processing, Visualization & Transmission, Oct. 13-15, 2012, pp. 432-439.

Buglio et al., "Revealing Shape Semantics from Morphological Similarities of a Collection of Architectural Elements: The Case Study of The Columns of Saint-Michel De Cuxa", Digital Heritage International Congress (DigitalHeritage), Oct. 28-Nov. 1, 2013, pp. 465-472.

Berger et al., "State of the Art in Surface Reconstruction from Point Clouds", The Eurographics, State of The Art Report, 2014, 25 pages.

Sahay et al., "Geometric Inpainting of 3D Structures", Conference on Computer Vision and Pattern Recognition Workshops (CVPRW), Jun. 7-12, 2015, pp. 1-7.

"Parameter Values for Ultra-high Definition Television Systems for Production and International Programme Exchange", Recommendation ITU-R BT.2020, Oct. 2015, 8 pgs.

"Parameter Values for the HDTV Standards for Production and International Programme Exchange", Recommendation ITU-R BT.709-6, Jun. 2015, 19 pgs.

Schwarz et al., "Nokia's response to CfP for Point Cloud Compression (Category 2)", Nokia Technologies, ISO/IEC UTC/SC29/WG11 MPEG2017/M41779, Oct. 2017, 22 pages.

\* cited by examiner

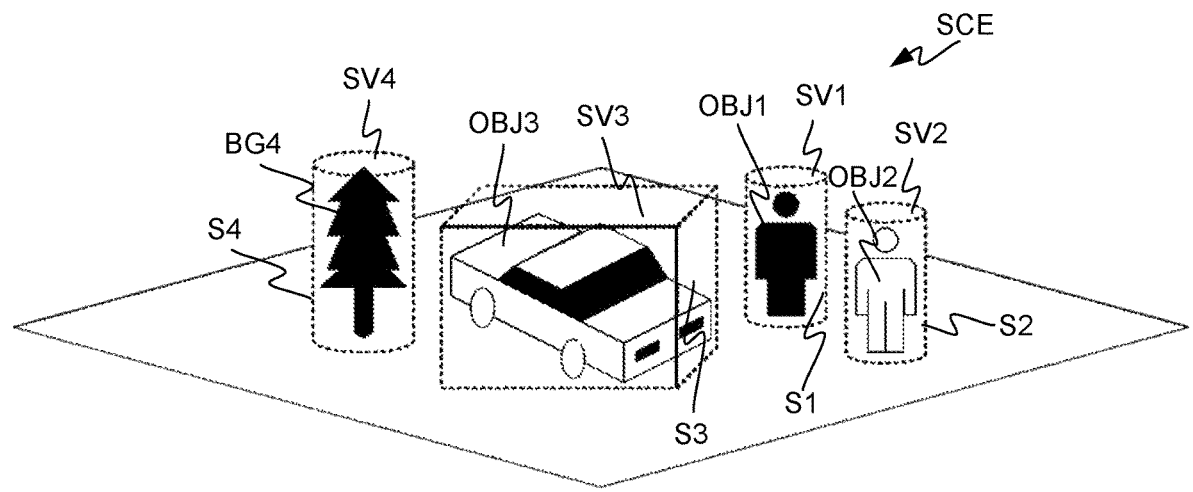
Fig. 5a
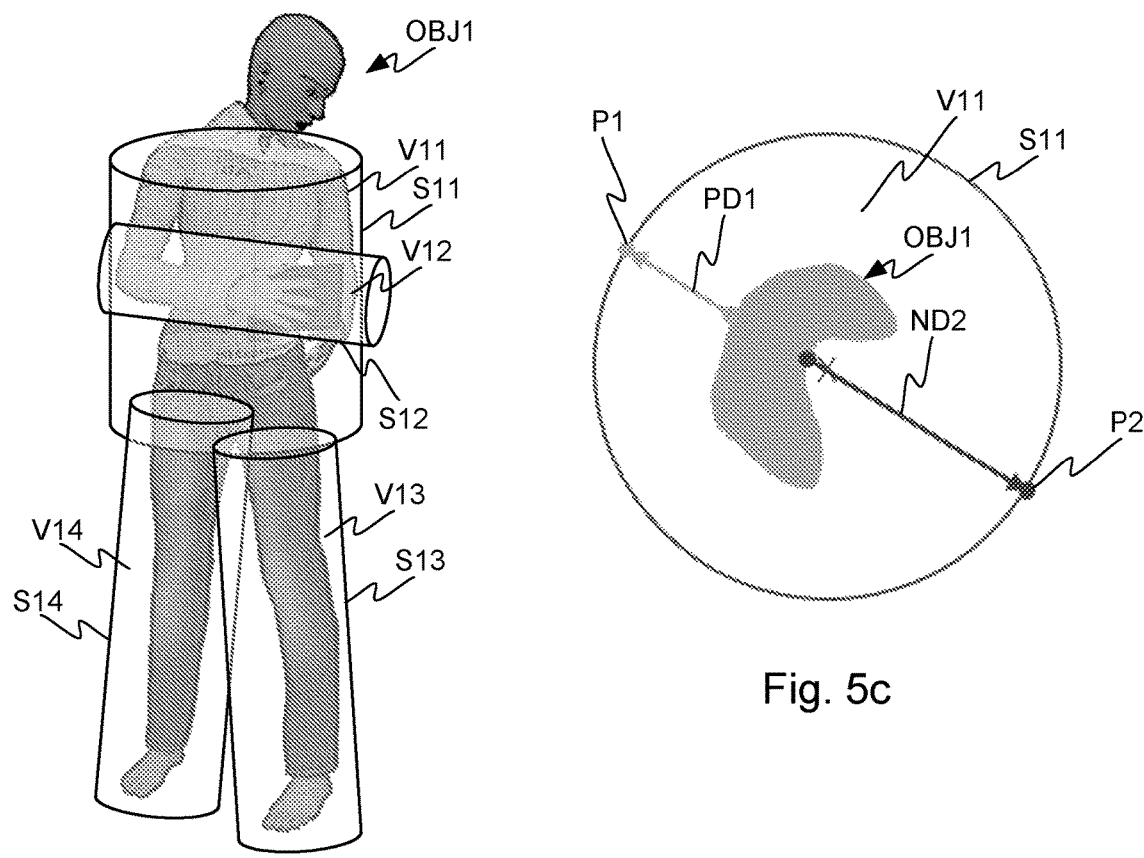
Fig. 5b
Fig. 5c

ENCODING AND DECODING OF VOLUMETRIC VIDEO

RELATED APPLICATION

This application was originally filed as PCT Application No. PCT/FI2018/050582, filed on Aug. 13, 2018, which claims priority from FI Application No. 20175730, filed on Aug. 15, 2017.

BACKGROUND

Volumetric video data represents a three-dimensional scene or object and can be used as input for virtual reality (VR), augmented reality (AR) and mixed reality (MR) applications. Such data describes the geometry, e.g. shape, size, position in 3D-space, and respective attributes, e.g. color, opacity, reflectance and any possible temporal changes of the geometry and attributes at given time instances, comparable to frames in 2D video. Volumetric video is either generated from 3D models through computer-generated imagery (CGI), or captured from real-world scenes using a variety of capture solutions, e.g. multi-camera, laser scan, combination of video and dedicated depth sensors, and more. Also, a combination of CGI and real-world data is possible.

Typical representation formats for such volumetric data are triangle meshes, point clouds (PCs), or voxel arrays. Temporal information about the scene can be included in the form of individual capture instances, i.e. "frames" in 2D video, or other means, e.g. position of an object as a function of time.

The above mentioned volumetric video representation formats suffer from poor spatial and temporal coding performance.

There is, therefore, a need for solutions for improved coding of volumetric video.

SUMMARY

Now there has been invented an improved method and technical equipment implementing the method, by which the above problems are alleviated. Various aspects of the invention include a method, an apparatus (an encoder and a decoder), a system and a computer readable medium comprising a computer program or a signal stored therein, which are characterized by what is stated in the independent claims. Various details of the invention are disclosed in the dependent claims and in the corresponding images and description.

A volumetric video, for example dynamic point clouds, arrays of voxels or mesh models or a combination of such, may be projected onto a number of projection surfaces having simple geometries, for example sphere(s), cylinder(s), cube(s), polyhedron(s) and/or plane(s). In this context, a projection surface may be a piece-wise continuous and smooth surface in three-dimensional space. Piece-wise smoothness may be understood so that there are regions of the surface where the direction of the surface normal does not change abruptly (i.e. the values of the coefficients of the surface normal's coordinate components are continuous). A projection surface may comprise pieces of simple geometric surfaces. A projection surface may also evolve (change) over time. On such surfaces, the texture and geometry of point clouds, voxel arrays or mesh models may form pixel images, e.g. texture images and depth images (indicative of distance from the projection plane). Such projection surfaces may be unfolded onto two-dimensional (2D) planes, e.g. resulting in a two-dimensional pixel image. Standard 2D video coding may be applied for each projection to code the pixel information resulting from the texture data. In connection with the texture information, relevant projection geometry information, comprising e.g. projection or projection surface type, location and orientation of the projection surface in 3D space, and/or size of the projection surface, may be transmitted either in the same bitstream or separately along the bitstream. At the receiver side, the bitstream may be decoded and volumetric video may be reconstructed from decoded 2D projections and projection geometry information.

In an encoding method, a bitstream may be encoded or encapsulated, the bitstream comprising one or more coded texture pictures and one or more coded accompanying additional pictures per texture picture. Each texture picture may represent a 2D projection of 3D data onto a given geometry. Alternatively or in addition, several projections may be frame-packed into a single picture. An additional geometry picture may represent geometry data, e.g. depth. Additional auxiliary pictures may represent further attributes, e.g. surface normal, reflectance and opacity, transmittance and/or refraction of the 3D data. Relevant projection information may be indicated in or along the bitstream. For example, general projection information may be given in or along the bitstream: number of coded texture pictures or frame-packing information. Projection geometry information may be given for the projections: for example comprising shape, size, location and orientation of the projection surfaces. Temporal changes in location, orientation and size of such geometries may be encoded, possibly as function of time. Possible further sub-division of such geometries and resulting changes in geometry information may be given. Nature of auxiliary geometry data may be given: bit depth, quantisation, value range and/or inverse values, that is, coding of negative radius or depth values of the geometry picture. Nature of other auxiliary data, i.e. surface normal, reflectance and opacity, transmittance and/or refraction, etc. may be given.

In a decoding method, a bitstream comprising one or more coded texture picture(s) and one or more coded accompanying geometry pictures and auxiliary pictures per texture picture may be received and decoded. The texture picture represents a two-dimensional projection of three-dimensional data onto a projection surface with a given geometry. A geometry picture may represent geometry data, e.g. depth from the projection surface. Additional auxiliary pictures may represent further attributes, e.g. surface normal, reflectance, opacity, etc. as described earlier. Relevant projection information may also be decoded from or along a bitstream. From this decoded information a 3D scene may be reconstructed accordingly.

According to a first aspect, there is provided a method, comprising encoding a first texture picture into a bitstream, said first texture picture comprising a first projection of texture data of a first source volume of a digital scene model, said scene model comprising a number of further source volumes, said first projection being from said first source volume to a first projection surface, encoding a first geometry picture into said bitstream, said first geometry picture representing a mapping of said first projection surface to said first source volume, and encoding first projection geometry information of said first projection into said bitstream, said first projection geometry information comprising information of position of said first projection surface in said scene model.

According to a second aspect, there is provided there is provided a method, comprising decoding a first texture picture from a bitstream to obtain first decoded texture data, said first texture picture comprising a first projection of texture data of a first source volume of a digital scene model, said scene model comprising a number of further source volumes, said first projection being from said first source volume to a first projection surface, decoding a first geometry picture from said bitstream to obtain first decoded scene geometry data, said first geometry picture representing a mapping of said first projection surface to said first source volume, and decoding first projection geometry information of said first projection from said bitstream, said first projection geometry information comprising information of position of said first projection surface in said scene model, computing a reconstructed scene model by projecting said first decoded texture data to a first destination volume using said first decoded scene geometry data and said first projection geometry information.

According to a third aspect, there is provided an apparatus comprising at least one processor, memory including computer program code, the memory and the computer program code configured to, with the at least one processor, cause the apparatus to perform at least the following: encode a first texture picture into a bitstream, said first texture picture comprising a first projection of texture data of a first source volume of a digital scene model, said scene model comprising a number of further source volumes, said first projection being from said first source volume to a first projection surface, encode a first geometry picture into said bitstream, said first geometry picture representing a mapping of said first projection surface to said first source volume, and encode first projection geometry information of said first projection into said bitstream, said first projection geometry information comprising information of position of said first projection surface in said scene model.

According to a fourth aspect, there is provided an apparatus comprising at least one processor, memory including computer program code, the memory and the computer program code configured to, with the at least one processor, cause the apparatus to perform at least the following: decode a first texture picture from a bitstream to obtain first decoded texture data, said first texture picture comprising a first projection of texture data of a first source volume of a digital scene model, said scene model comprising a number of further source volumes, said first projection being from said first source volume to a first projection surface, decode a first geometry picture from said bitstream to obtain first decoded scene geometry data, said first geometry picture representing a mapping of said first projection surface to said first source volume, decode first projection geometry information of said first projection from said bitstream, said first projection geometry information comprising information of position of said first projection surface in said scene model, and compute a reconstructed scene model by projecting said first decoded texture data to a first destination volume using said first decoded scene geometry data and said first decoded projection geometry information.

According to a first aspect, there is provided a system comprising at least one processor, memory including computer program code, the memory and the computer program code configured to, with the at least one processor, cause the system to perform at least the following: encode a first texture picture into a bitstream, said first texture picture comprising a first projection of texture data of a first source volume of a digital scene model, said scene model comprising a number of further source volumes, said first projection being from said first source volume to a first projection surface, encode a first geometry picture into said bitstream, said first geometry picture representing a mapping of said first projection surface to said first source volume, encode first projection geometry information of said first projection into said bitstream, said first projection geometry information comprising information of position of said first projection surface in said scene model, decode said first texture picture from a bitstream to obtain first decoded texture data, decode said first geometry picture from said bitstream to obtain first decoded scene geometry data, and decode said first projection geometry information of said first projection from said bitstream, and compute a reconstructed scene model by projecting said first decoded texture data to a first destination volume using said first decoded scene geometry data and said first decoded projection geometry information.

According to further aspects, there are provided computer program products embodied on a non-transitory computer readable medium, comprising computer program code configured to, when executed on at least one processor, cause an apparatus or a system to carry out the method of the first or second aspect.

DESCRIPTION OF THE DRAWINGS

In the following, various embodiments of the invention will be described in more detail with reference to the appended drawings, in which

FIGS. 5a, 5b and 5c illustrate projection of source volumes in a scene and parts of an object to projection surfaces, as well as determining depth information;

DESCRIPTION OF EXAMPLES

In the following, several embodiments of the invention will be described in the context of point cloud, voxel or mesh scene models for three-dimensional volumetric video and pixel and picture based two-dimensional video coding. It is to be noted, however, that the invention is not limited to specific scene models or specific coding technologies. In fact, the different embodiments have applications in any environment where coding of volumetric scene data is required.

It has been noticed here that identifying correspondences for motion-compensation in three-dimensional space is an ill-defined problem, as both the geometry and the respective attributes of the objects to be coded may change. For example, temporal successive "frames" do not necessarily have the same number of meshes, points or voxel. Therefore, compression of dynamic 3D scenes is inefficient.

Figure 1:
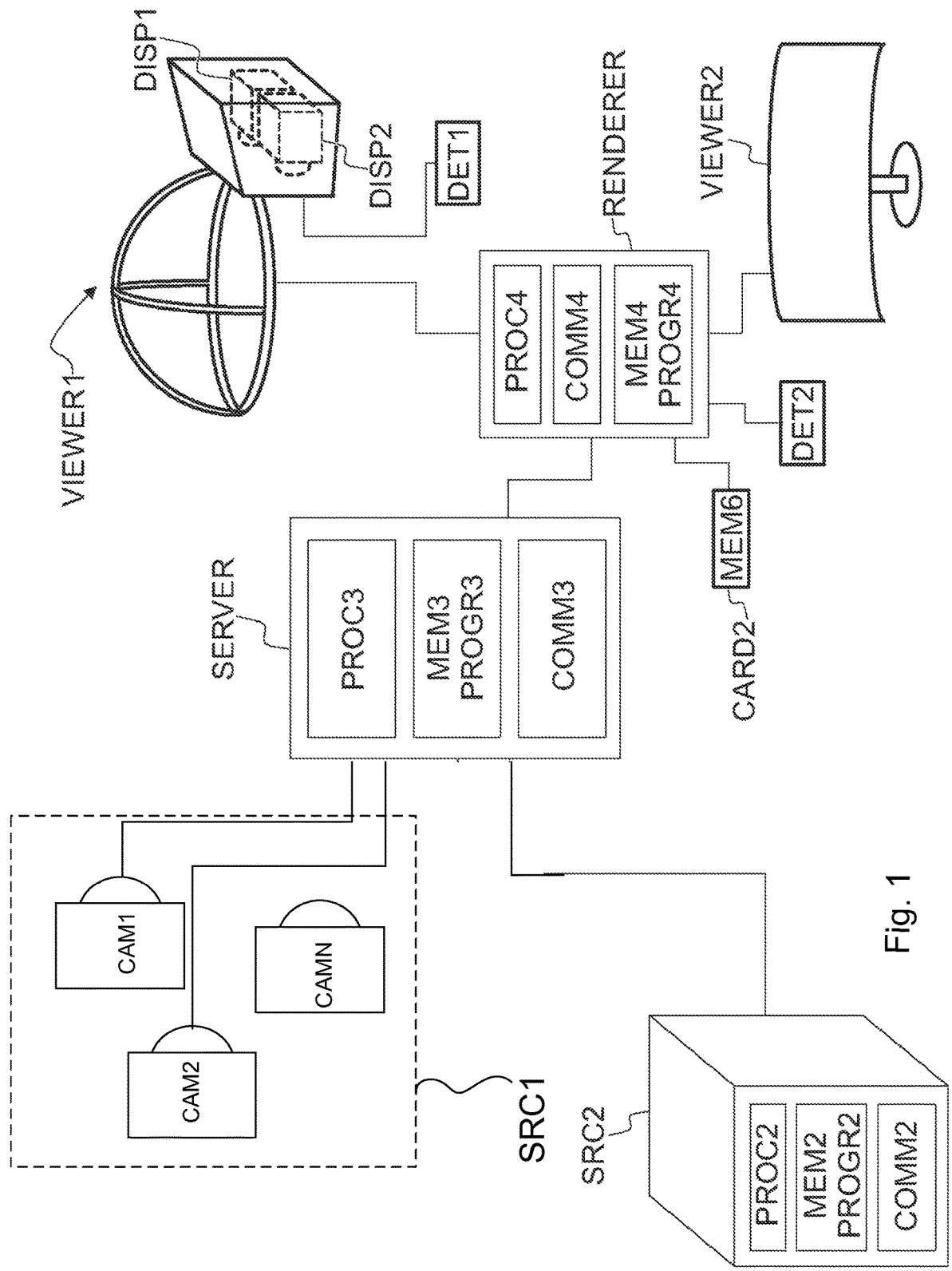
FIG. 1 shows a system for capturing, encoding, decoding, reconstructing and viewing a three-dimensional scheme.

FIG. 1 shows a system for capturing, encoding, decoding, reconstructing and viewing a three-dimensional scheme, that is, for 3D video and 3D audio digital creation and playback. The task of the system is that of capturing sufficient visual and auditory information from a specific scene to be able to create a scene model such that a convincing reproduction of the experience, or presence, of being in that location can be achieved by one or more viewers physically located in different locations and optionally at a time later in the future. Such reproduction requires more information that can be captured by a single camera or microphone, in order that a viewer can determine the distance and location of objects within the scene using their eyes and their ears. To create a pair of images with disparity, two camera sources are used. In a similar manner, for the human auditory system to be able to sense the direction of sound, at least two microphones are used (the commonly known stereo sound is created by recording two audio channels). The human auditory system can detect the cues, e.g. in timing difference of the audio signals to detect the direction of sound.

The system of FIG. 1 may consist of three main parts: image sources, a server and a rendering device. A video source SRC1 may comprise multiple cameras CAM1, CAM2, . . . , CAMN with overlapping field of view so that regions of the view around the video capture device is captured from at least two cameras. The video source SRC1 may comprise multiple microphones to capture the timing and phase differences of audio originating from different directions. The video source SRC1 may comprise a high resolution orientation sensor so that the orientation (direction of view) of the plurality of cameras CAM1, CAM2, . . . , CAMN can be detected and recorded. The cameras or the computers may also comprise or be functionally connected to means for forming distance information corresponding to the captured images, for example so that the pixels have corresponding depth data. Such depth data may be formed by scanning the depth or it may be computed from the different images captured by the cameras. The video source SRC1 comprises or is functionally connected to, or each of the plurality of cameras CAM1, CAM2, . . . , CAMN comprises or is functionally connected to a computer processor and memory, the memory comprising computer program code for controlling the source and/or the plurality of cameras. The image stream captured by the video source, i.e. the plurality of the cameras, may be stored on a memory device for use in another device, e.g. a viewer, and/or transmitted to a server using a communication interface. It needs to be understood that although a video source comprising three cameras is described here as part of the system, another amount of camera devices may be used instead as part of the system.

Alternatively or in addition to the source device SRC1 creating information for forming a scene model, one or more sources SRC2 of synthetic imagery may be present in the system, comprising a scene model. Such sources may be used to create and transmit the scene model and its development over time, e.g. instantaneous states of the model. The model can be created or provided by the source SRC1 and/or SRC2, or by the server SERVER. Such sources may also use the model of the scene to compute various video bitstreams for transmission.

One or more two-dimensional video bitstreams may be computed at the server SERVER or a device RENDERER used for rendering, or another device at the receiving end. When such computed video streams are used for viewing, the viewer may see a three-dimensional virtual world as described in the context of FIGS. 4a-4d. The devices SRC1 and SRC2 may comprise or be functionally connected to a computer processors (PROC2 shown) and memory (MEM2 shown), the memory comprising computer program (PROGR2 shown) code for controlling the source device SRC1/SRC2. The image stream captured by the device and the scene model may be stored on a memory device for use in another device, e.g. a viewer, or transmitted to a server or the viewer using a communication interface COMM2. There may be a storage, processing and data stream serving network in addition to the capture device SRC1. For example, there may be a server SERVER or a plurality of servers storing the output from the capture device SRC1 or device SRC2 and/or to form a scene model from the data from devices SRC1, SRC2. The device SERVER comprises or is functionally connected to a computer processor PROC3 and memory MEM3, the memory comprising computer program PROGR3 code for controlling the server. The device SERVER may be connected by a wired or wireless network connection, or both, to sources SRC1 and/or SRC2, as well as the viewer devices VIEWER1 and VIEWER2 over the communication interface COMM3.

The creation of a three-dimensional scene model may take place at the server SERVER or another device by using the images captured by the devices SRC1. The scene model may be a model created from captured image data (a real world model), or a synthetic model such as on device SRC2, or a combination of such. As described later, the scene model may be encoded to reduce its size and transmitted to a decoder, for example viewer devices.

For viewing the captured or created video content, there may be one or more viewer devices VIEWER1 and VIEWER2. These devices may have a rendering module and a display module, or these functionalities may be combined in a single device. The devices may comprise or be functionally connected to a computer processor PROC4 and memory MEM4, the memory comprising computer program PROG4 code for controlling the viewing devices. The viewer (playback) devices may consist of a data stream receiver for receiving a video data stream and for decoding the video data stream. The video data stream may be received from the server SERVER or from some other entity, such as a proxy server, an edge server of a content delivery network, or a file available locally in the viewer device. The data stream may be received over a network connection through communications interface COMM4, or from a memory device MEM6 like a memory card CARD2. The viewer devices may have a graphics processing unit for processing of the data to a suitable format for viewing. The viewer VIEWER1 may comprise a high-resolution stereo-image head-mounted display for viewing the rendered stereo video sequence. The head-mounted display may have an orientation sensor DET1 and stereo audio headphones. The viewer VIEWER2 may comprise a display (either two-dimensional or a display enabled with 3D technology for displaying stereo video), and the rendering device may have an orientation detector DET2 connected to it. Alternatively, the viewer VIEWER2 may comprise a 2D display, since the volumetric video rendering can be done in 2D by rendering the viewpoint from a single eye instead of a stereo eye pair.

It needs to be understood that FIG. 1 depicts one SRC1 device and one SRC2 device, but generally the system may comprise more than one SRC1 device and/or SRC2 device.

Any of the devices (SRC1, SRC2, SERVER, RENDERER, VIEWER1, VIEWER2) may be a computer or a portable computing device, or be connected to such. Moreover, even if the devices (SRC1, SRC2, SERVER, RENDERER, VIEWER1, VIEWER2) are depicted as a single device in FIG. 1, they may comprise multiple parts or may be comprised of multiple connected devices. For example, it needs to be understood that SERVER may comprise several devices, some of which may be used for editing the content produced by SRC1 and/or SRC2 devices, some others for compressing the edited content, and a third set of devices may be used for transmitting the compressed content. Such devices may have computer program code for carrying out methods according to various examples described in this text.

Figure 2A:
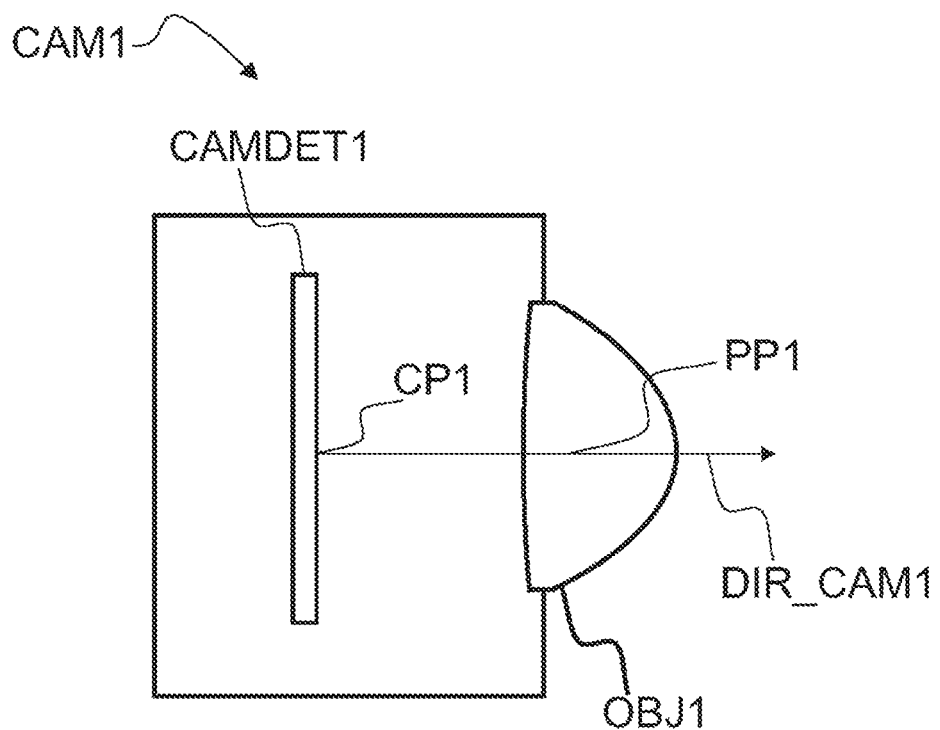
FIGS. 2a and 2b show a capture device and a viewing device.
Figure 2B:
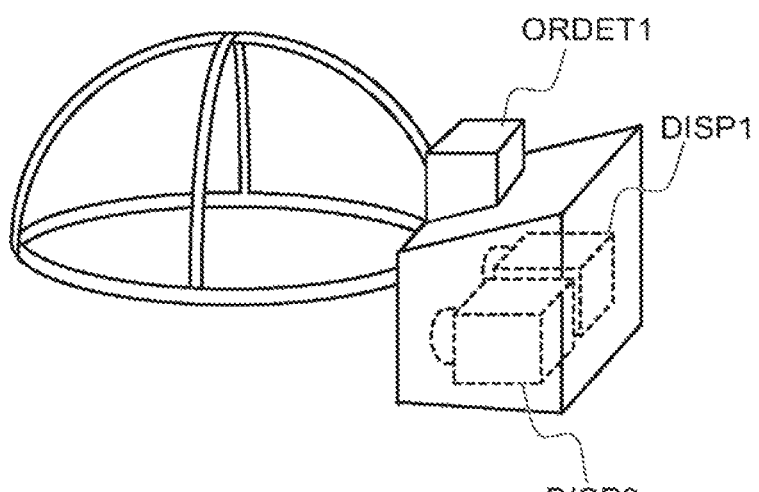

FIGS. 2a and 2b show a capture device and a viewing device. FIG. 2a illustrates a camera CAM1. The camera has a camera detector CAMDET1, comprising a plurality of sensor elements for sensing intensity of the light hitting the sensor element. The camera has a lens OBJ1 (or a lens arrangement of a plurality of lenses), the lens being positioned so that the light hitting the sensor elements travels through the lens to the sensor elements. The camera detector CAMDET1 has a nominal center point CP1 that is a middle point of the plurality of sensor elements, for example for a rectangular sensor the crossing point of the diagonals. The lens has a nominal center point PP1, as well, lying for example on the axis of symmetry of the lens. The direction of orientation of the camera is defined by the line passing through the center point CP1 of the camera sensor and the center point PP1 of the lens. The direction of the camera is a vector along this line pointing in the direction from the camera sensor to the lens. The optical axis of the camera is understood to be this line CP1-PP1.

FIG. 2b shows a head-mounted display (HMD) for stereo viewing. The head-mounted display comprises two screen sections or two screens DISP1 and DISP2 for displaying the left and right eye images. The displays are close to the eyes, and therefore lenses are used to make the images easily viewable and for spreading the images to cover as much as possible of the eyes' field of view. The device is attached to the head of the user so that it stays in place even when the user turns his head. The device may have an orientation detecting module ORDET1 for determining the head movements and direction of the head. The head-mounted display gives a three-dimensional (3D) perception of the recorded/streamed content to a user.

The system described above may function as follows. Time-synchronized video and orientation data is first recorded with the capture devices. This can consist of multiple concurrent video streams as described above. One or more time-synchronized audio streams may also be recorded with the capture devices. The different capture devices may form image and geometry information of the scene from different directions. For example, there may be three, four, five, six or more cameras capturing the scene from different sides, like front, back, left and right, and/or at directions between these, as well as from the top or bottom, or any combination of these. The cameras may be at different distances, for example some of the cameras may capture the whole scene and some of the cameras may be capturing one or more objects in the scene. In an arrangement used for capturing volumetric video data, several cameras may be directed towards an object, looking onto the object from different directions, where the object is e.g. in the middle of the cameras. In this manner, the texture and geometry of the scene and the objects within the scene may be captured adequately. As mentioned earlier, the cameras or the system may comprise means for determining geometry information, e.g. depth data, related to the captured video streams. From these concurrent video and audio streams, a computer model of a scene may be created. Alternatively or additionally, a synthetic computer model of a virtual scene may be used. The models (at successive time instances) are then transmitted immediately or later to the storage and processing network for processing and conversion into a format suitable for subsequent delivery to playback devices. The conversion may involve processing and coding to improve the quality and/or reduce the quantity of the scene model data while preserving the quality at a desired level. Each playback device receives a stream of the data (either computed video data or scene model data) from the network, and renders it into a viewing reproduction of the original location which can be experienced by a user. The reproduction may be two-dimensional or three-dimensional (stereo image pairs).

Figure 3A:
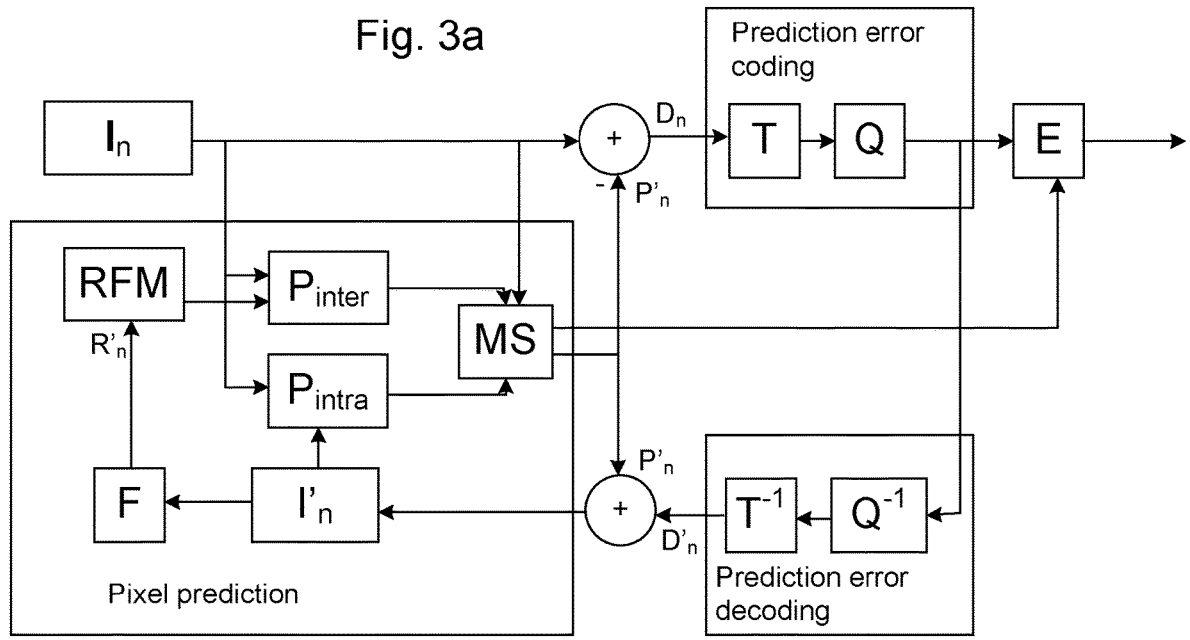
FIGS. 3a and 3b show an encoder and decoder for encoding and decoding texture pictures, geometry pictures and/or auxiliary pictures.
Figure 3B:
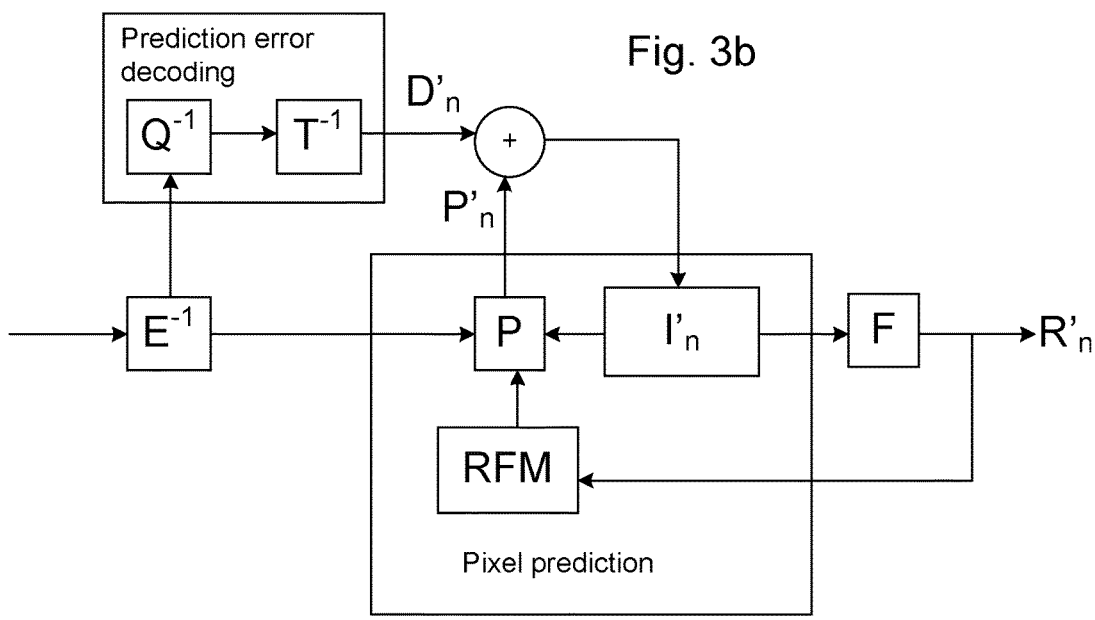

FIGS. 3a and 3b show an encoder and decoder for encoding and decoding texture pictures, geometry pictures and/or auxiliary pictures. A video codec consists of an encoder that transforms an input video into a compressed representation suited for storage/transmission and a decoder that can uncompress the compressed video representation back into a viewable form. Typically, the encoder discards and/or loses some information in the original video sequence in order to represent the video in a more compact form (that is, at lower bitrate). An example of an encoding process is illustrated in FIG. 3a. FIG. 3a illustrates an image to be encoded (I''); a predicted representation of an image block (P'''); a prediction error signal (D''); a reconstructed prediction error signal (D'''); a preliminary reconstructed image (I'''); a final reconstructed image (R'''); a transform (T) and inverse transform ($T^{-1}$); a quantization (Q) and inverse quantization ($Q^{-1}$); entropy encoding (E); a reference frame memory (RFM); inter prediction ($P^{inter}$); intra prediction ($P^{intra}$); mode selection (MS) and filtering (F).

An example of a decoding process is illustrated in FIG. 3b. FIG. 3b illustrates a predicted representation of an image block (P'''); a reconstructed prediction error signal (D'''); a preliminary reconstructed image (I'''); a final reconstructed image (R'''); an inverse transform ($T^{-1}$); an inverse quantization ($Q^{-1}$); an entropy decoding ($E^{-1}$); a reference frame memory (RFM); a prediction (either inter or intra) (P); and filtering (F).

Figure 4A:
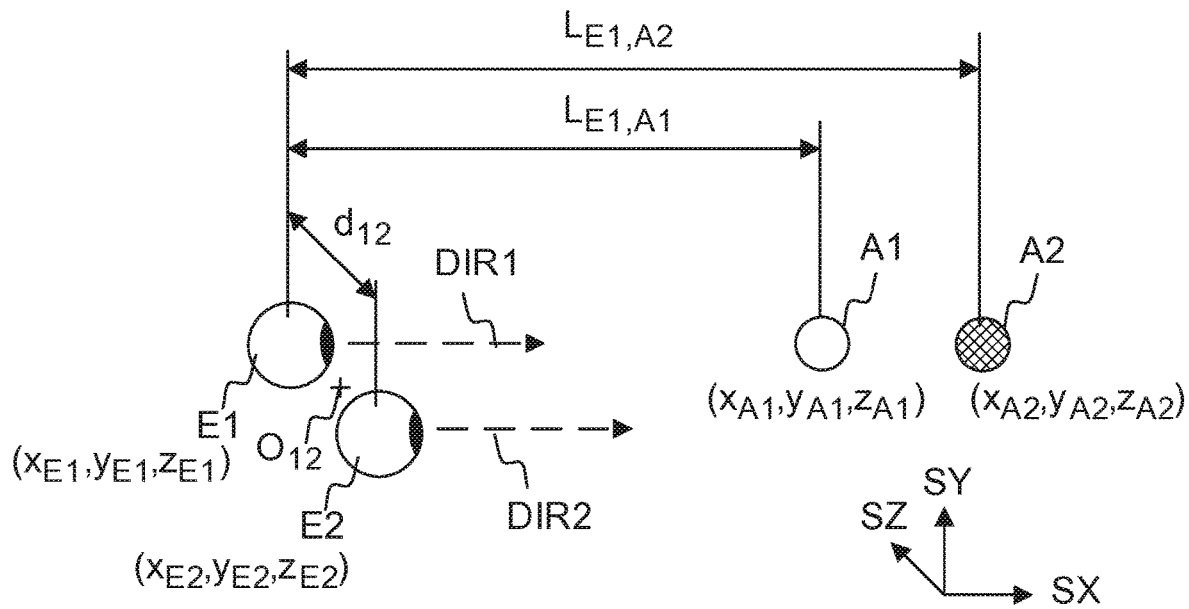
FIGS. 4a, 4b, 4c and 4d show a setup for forming a stereo image of a scene to a user.

FIGS. 4a, 4b, 4c and 4d show a setup for forming a stereo image of a scene to a user, for example a video frame of a 3D video. In FIG. 4a, a situation is shown where a human being is viewing two spheres A1 and A2 using both eyes E1 and E2. The sphere A1 is closer to the viewer than the sphere A2, the respective distances to the first eye E1 being $L_{E1,A1}$ and $L_{E1,A2}$. The different objects reside in space at their respective (x,y,z) coordinates, defined by the coordinate system SZ, SY and SZ. The distance $d_{12}$ between the eyes of a human being may be approximately 62-64 mm on average, and varying from person to person between 55 and 74 mm. This distance is referred to as the parallax, on which stereoscopic view of the human vision is based on. The viewing directions (optical axes) DIR1 and DIR2 are typically essentially parallel, possibly having a small deviation from being parallel, and define the field of view for the eyes. The head of the user has an orientation (head orientation) in relation to the surroundings, most easily defined by the common direction of the eyes when the eyes are looking straight ahead. That is, the head orientation tells the yaw, pitch and roll of the head in respect of a coordinate system of the scene where the user is.

When the viewer's body (thorax) is not moving, the viewer's head orientation is restricted by the normal anatomical ranges of movement of the cervical spine.

In the setup of FIG. 4a, the spheres A1 and A2 are in the field of view of both eyes. The center-point $O_{12}$ between the eyes and the spheres are on the same line. That is, from the center-point, the sphere A2 is behind the sphere A1. However, each eye sees part of sphere A2 from behind A1, because the spheres are not on the same line of view from either of the eyes.

Figure 4B:
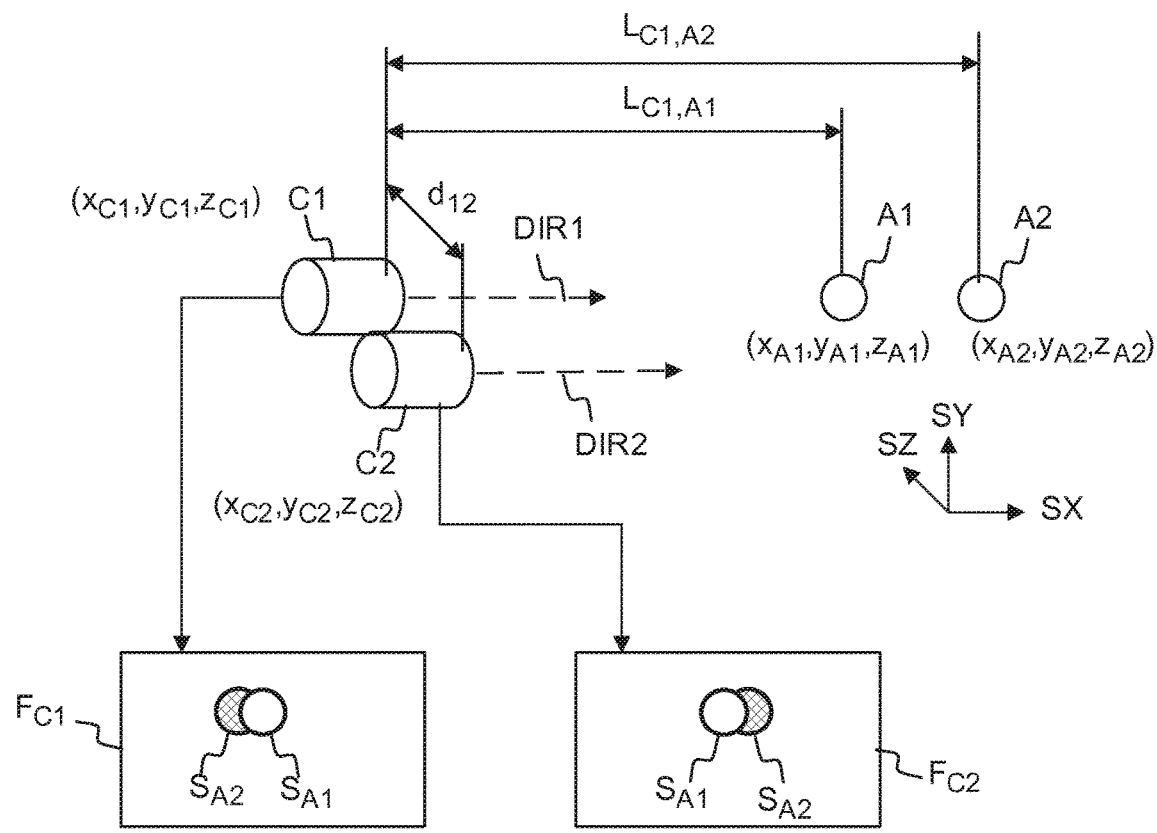

In FIG. 4b, there is a setup shown, where the eyes have been replaced by cameras C1 and C2, positioned at the location where the eyes were in FIG. 4a. The distances and directions of the setup are otherwise the same. Naturally, the purpose of the setup of FIG. 4b is to be able to take a stereo image of the spheres A1 and A2. The two images resulting from image capture are $F_{C1}$ and $F_{C2}$. The "left eye" image $F_{C1}$ shows the image $S_{A2}$ of the sphere A2 partly visible on the left side of the image $S_{A1}$ of the sphere A1. The "right eye" image $F_{C2}$ shows the image $S_{A2}$ of the sphere A2 partly visible on the right side of the image $S_{A1}$ of the sphere A1. This difference between the right and left images is called disparity, and this disparity, being the basic mechanism with which the HVS determines depth information and creates a 3D view of the scene, can be used to create an illusion of a 3D image.

In this setup of FIG. 4b, where the inter-eye distances correspond to those of the eyes in FIG. 4a, the camera pair C1 and C2 has a natural parallax, that is, it has the property of creating natural disparity in the two images of the cameras. Natural disparity may be understood to be created even though the distance between the two cameras forming the stereo camera pair is somewhat smaller or larger than the normal distance (parallax) between the human eyes, e.g. essentially between 40 mm and 100 mm or even 30 mm and 120 mm.

It needs to be understood here that the images $F_{C1}$ and $F_{C2}$ may be captured by cameras C1 and C2, where the cameras C1 and C2 may be real-world cameras or they may be virtual cameras. In the case of virtual cameras, the images $F_{C1}$ and $F_{C2}$ may be computed from a computer model of a scene by setting the direction, orientation and viewport of the cameras C1 and C2 appropriately such that a stereo image pair suitable for viewing by the human visual system (HVS) is created.

Figure 4C:
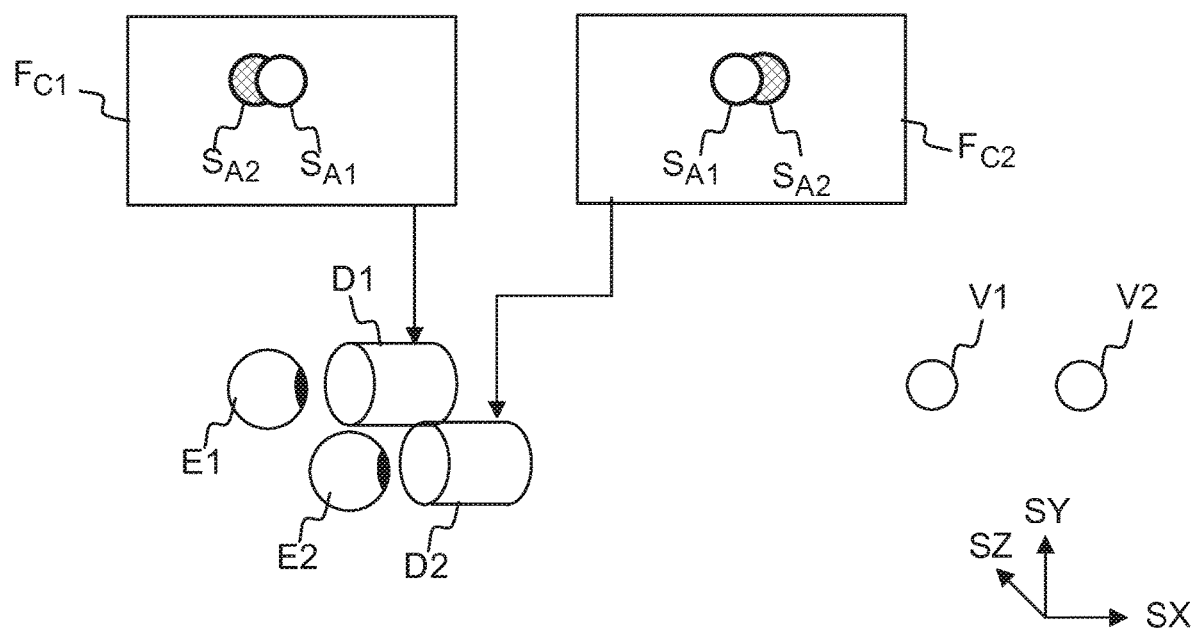

In FIG. 4c, the creating of this 3D illusion is shown. The images $F_{C1}$ and $F_{C2}$ captured or computed by the cameras C1 and C2 are displayed to the eyes E1 and E2, using displays D1 and D2, respectively. The disparity between the images is processed by the HVS so that an understanding of depth is created. That is, when the left eye sees the image $S_{A2}$ of the sphere A2 on the left side of the image $S_{A1}$ of sphere A1, and respectively the right eye sees the image of A2 on the right side, the HVS creates an understanding that there is a sphere V2 behind the sphere V1 in a three-dimensional world. Here, it needs to be understood that the images $F_{C1}$ and $F_{C2}$ can also be synthetic, that is, created by a computer. If they carry the disparity information, synthetic images will also be seen as three-dimensional by the HVS. That is, a pair of computer-generated images can be formed so that they can be used as a stereo image.

Figure 4D:
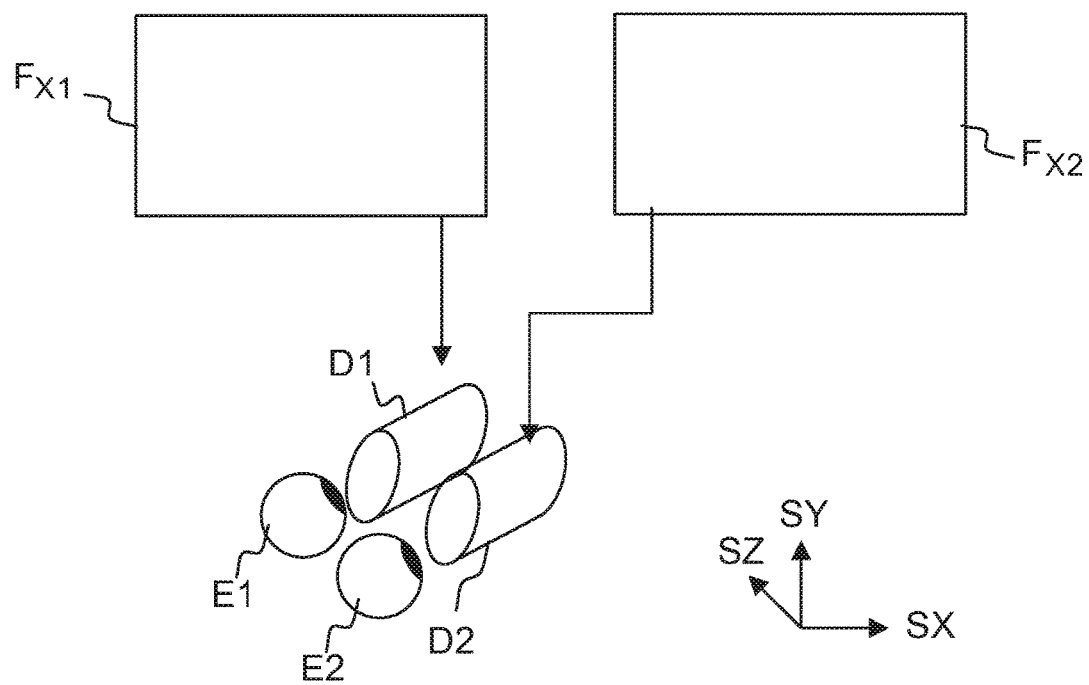

FIG. 4d illustrates how the principle of displaying stereo images to the eyes can be used to create 3D movies or virtual reality scenes having an illusion of being three-dimensional. The images $F_{X1}$ and $F_{X2}$ are either captured with a stereo camera or computed from a model so that the images have the appropriate disparity. By displaying a large number (e.g. 30) frames per second to both eyes using display D1 and D2 so that the images between the left and the right eye have disparity, the HVS will create a cognition of a moving, three-dimensional image.

The field of view represented by the content may be greater than the displayed field of view e.g. in an arrangement depicted in FIG. 4d. Consequently, only a part of the content along the direction of view (a.k.a. viewing orientation) is displayed at a single time. This direction of view, that is, the head orientation, may be determined as a real orientation of the head e.g. by an orientation detector mounted on the head, or as a virtual orientation determined by a control device such as a joystick or mouse that can be used to manipulate the direction of view without the user actually moving his head. That is, the term "head orientation" may be used to refer to the actual, physical orientation of the user's head and changes in the same, or it may be used to refer to the virtual direction of the user's view that is determined by a computer program or a computer input device.

The content may enable viewing from several viewing positions within the 3D space. The texture picture(s), the geometry picture(s) and the geometry information may be used to synthesize the images $F_{X1}$ and/or $F_{X2}$ as if the displayed content was captured by camera(s) located at the viewing position.

The principle illustrated in FIGS. 4a-4d may be used to create three-dimensional images to a viewer from a three-dimensional scene model (volumetric video) after the scene model has been encoded at the sender and decoded and reconstructed at the receiver. Because volumetric video describes a 3D scene or object at different (successive) time instances, such data can be viewed from any viewpoint. Therefore, volumetric video is an important format for any augmented reality, virtual reality and mixed reality applications, especially for providing viewing capabilities having six degrees of freedom (so-called 6DOF viewing).

FIGS. 5a, 5b and 5c illustrate projection of source volumes in a digital scene model SCE and parts of an object model OBJ1, OBJ2, OBJ3, BG4 to projection surfaces S1, S2, S3, S4, as well as determining depth information for the purpose of encoding volumetric video.

The projection of source volumes SV1, SV2, SV3, SV4 may result in texture pictures and geometry pictures, and there may be geometry information related to the projection source volumes and/or projection surfaces. Texture pictures, geometry pictures and projection geometry information may be encoded into a bitstream. A texture picture may comprise information on the color data of the source of the projection. Through the projection, such color data may result in pixel color information in the texture picture. Pixels may be coded in groups, e.g. coding units of rectangular shape. The projection geometry information may comprise but is not limited to one or more of the following:

projection type, such as planar projection or equirectangular projection
projection surface type, such as a cube
location of the projection surface in 3D space
orientation of the projection surface in 3D space
size of the projection surface in 3D space
type of a projection center, such as a projection center point, axis, or plane
location and/or orientation of a projection center.

The projection may take place by projecting the geometry primitives (points of a point could, triangles of a triangle mesh or voxels of a voxel array) of a source volume SV1, SV2, SV3, SV4 (or an object OBJ1, OBJ2, OBJ3, BG4) onto a projection surface S1, S2, S3, S4. The geometry primitives may comprise information on the texture, for example a colour value or values of a point, a triangle or a voxel. The projection surface may surround the source volume at least partially such that projection of the geometry primitives happens from the center of the projection surface outwards to the surface. For example, a cylindrical surface has a center axis and a spherical surface has a center point. A cubical or rectangular surface may have center planes or a center axis and the projection of the geometry primitives may take place either orthogonally to the sides of the surface or from the center axis outwards to the surface. The projection surfaces, e.g. cylindrical and rectangular, may be open from the top and the bottom such that when the surface is cut and rolled out on a two-dimensional plane, it forms a rectangular shape. Such rectangular shape with pixel data can be encoded and decoded with a video codec.

Alternatively or in addition, the projection surface such as a planar surface or a sphere may be inside group of geometry primitives, e.g. inside a point cloud that defines a surface. In the case of an inside projection surface, the projection may take place from outside in towards the center and may result in sub-sampling of the texture data of the source.

In a point cloud based scene model or object model, points may be represented with any floating point coordinates. A quantized point cloud may be used to reduce the amount of data, whereby the coordinate values of the point cloud are represented e.g. with 10-bit, 12-bit or 16-bit integers. Integers may be used because hardware accelerators may be able to operate on integers more efficiently. The points in the point cloud may have associated colour, reflectance, opacity etc. texture values. The points in the point cloud may also have a size, or a size may be the same for all points. The size of the points may be understood as indicating how large an object the point appears to be in the model in the projection. The point cloud is projected by ray casting from the projection surface to find out the pixel values of the projection surface. In such a manner, the topmost point remains visible in the projection, while points closer to the center of the projection surface may be occluded. In other words, in general, the original point cloud, meshes, voxels, or any other model is projected outwards to a simple geometrical shape, this simple geometrical shape being the projection surface.

Different projection surfaces may have different characteristics in terms of projection and reconstruction. In the sense of computational complexity, a projection to a cubical surface may be the most efficient, and a cylindrical projection surface may provide accurate results efficiently. Also cones, polyhedron-based parallelepipeds (hexagonal or octagonal, for example) and spheres or a simple plane may be used as projection surfaces.

The phrase along the bitstream (e.g. indicating along the bitstream) may be defined to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream. For example, an indication along the bitstream may refer to metadata in a container file that encapsulates the bitstream.

As illustrated in FIG. 5a, a first texture picture may be encoded into a bitstream, and the first texture picture may comprise a first projection of texture data of a first source volume SV1 of a scene model SCE onto a first projection surface S1. The scene model SCE may comprise a number of further source volumes SV2, SV3, SV4.

In the projection, data on the position of the originating geometry primitive may also be determined, and based on this determination, a geometry picture may be formed. This may happen for example so that depth data is determined for each or some of the texture pixels of the texture picture. Depth data is formed such that the distance from the originating geometry primitive such as a point to the projection surface is determined for the pixels. Such depth data may be represented as a depth picture, and similarly to the texture picture, such geometry picture (in this example, depth picture) may be encoded and decoded with a video codec. This first geometry picture may be seen to represent a mapping of the first projection surface to the first source volume, and the decoder may use this information to determine the location of geometry primitives in the model to be reconstructed. In order to determine the position of the first source volume and/or the first projection surface and/or the first projection in the scene model, there may be first geometry information encoded into or along the bitstream.

A picture may be defined to be either a frame or a field. A frame may be defined to comprise a matrix of luma samples and possibly the corresponding chroma samples. A field may be defined to be a set of alternate sample rows of a frame. Fields may be used as encoder input for example when the source signal is interlaced. Chroma sample arrays may be absent (and hence monochrome sampling may be in use) or may be subsampled when compared to luma sample arrays. Some chroma formats may be summarized as follows:

In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling when no separate color planes are in use, each of the two chroma arrays has the same height and width as the luma array.

It is possible to code sample arrays as separate color planes into the bitstream and respectively decode separately coded color planes from the bitstream. When separate color planes are in use, each one of them is separately processed (by the encoder and/or the decoder) as a picture with monochrome sampling.

Texture picture(s) and the respective geometry picture(s) may have the same or different chroma format.

Depending on the context, a pixel may be defined to a be a sample of one of the sample arrays of the picture or may be defined to comprise the collocated samples of all the sample arrays of the picture.

Multiple source volumes (objects) may be encoded as texture pictures, geometry pictures and projection geometry information into the bitstream in a similar manner. That is, as in FIG. 5a, the scene model SCE may comprise multiple objects OBJ1, OBJ2, OBJ3, OBJ4, and these may be treated as source volumes SV1, SV2, SV3, SV4 and each object may be coded as a texture picture, geometry picture and projection geometry information. As shown in FIG. 5b, a single object may be composed of different parts and thus different source volumes V11, V12, V13, V14 and corresponding projection surfaces S11, S12, S13, S14 may be used for these different parts.

In the above, the first texture picture of the first source volume SV1 and further texture pictures of the other source volumes SV2, SV3, SV4 may represent the same time instance. That is, there may be a plurality of texture and geometry pictures and projection geometry information for one time instance, and the other time instances may be coded in a similar manner. Since the various source volumes are in this way producing sequences of texture pictures and sequences of geometry pictures, as well as sequences of projection geometry information. The inter-picture redundancy in the picture sequences can be used to encode the texture and geometry data for the source volumes efficiently, compared to the presently known ways of encoding volume data.

An object BG4 (source volume SV4) may be projected onto a projection surface S4 and encoded into the bitstream as a texture picture, geometry picture and projection geometry information as described above. Furthermore, such source volume may be indicated to be static by encoding information into said bitstream on said fourth projection geometry being static. A static source volume or object may be understood to be an object whose position with respect to the scene model remains the same over two or more or all time instances of the video sequence. For such static source volume, the geometry data (geometry pictures) may also stay the same, that is, the object's shape remains the same over two or more time instances. For such static source volume, some or all of the texture data (texture pictures) may stay the same over two or more time instances. By encoding information into the bitstream of the static nature of the source volume the encoding efficiency may be further improved, as the same information may not need to be coded multiple times. In this manner, the decoder will also be able to use the same reconstruction or partially same reconstruction of the source volume (object) over multiple time instances.

In an analogous manner, the different source volumes may be coded into the bitstream with different frame rates. For example, a slow-moving or relatively unchanging object (source volume) may be encoded with a first frame rate, and a fast-moving and/or changing object (source volume) may be coded with a second frame rate. The first frame rate may be slower than the second frame rate, for example one half or one quarter of the second frame rate, or even slower. For example, if the second frame rate is 30 frames per second, the second frame rate may be 15 frames per second, or 1 frame per second. The first and second object (source volumes) may be "sampled" in synchrony such that some frames of the faster frame rate coincide with frames of the slower frame rate.

There may be one or more coordinate systems in the scene model. The scene model may have a coordinate system and one or more of the objects (source volumes) in the scene model may have their local coordinate systems. The shape, size, location and orientation of one or more projection surfaces may be encoded into or along the bitstream with respect to the scene model coordinates. Alternatively or in addition, the encoding may be done with respect to coordinates of the scene model or said first source volume. The choice of coordinate systems may improve the coding efficiency.

Information on temporal changes in location, orientation and size of one or more said projection surfaces may be encoded into or along the bitstream. For example, if one or more of the objects (source volumes) being encoded is moving or rotating with respect to the scene model, the projection surface moves or rotates with the object to preserve the projection as similar as possible.

If the projection volumes are changing, for example splitting or bending into two parts, the projection surfaces may be sub-divided respectively. Therefore, information on sub-division of one or more of the source volumes and respective changes in one or more of the projection surfaces may be encoded into or along the bitstream.

The resulting bitstream may then be output to be stored or transmitted for later decoding and reconstruction of the scene model.

Decoding of the information from the bitstream may happen in analogous manner. A first texture picture may be decoded from a bitstream to obtain first decoded texture data, where the first texture picture comprises a first projection of texture data of a first source volume of the scene model to be reconstructed onto a first projection surface. The scene model may comprise a number of further source volumes. Then, a first geometry picture may be decoded from the bitstream to obtain first decoded scene model geometry data. The first geometry picture may represent a mapping of the first projection surface to the first source volume. First projection geometry information of the first projection may be decoded from the bitstream, the first projection geometry information comprising information of position of the first projection surface in the scene model. Using this information, a reconstructed scene model may be formed by projecting the first decoded texture data to a first destination volume using the first decoded scene model geometry data and said first projection geometry information to determine where the decoded texture information is to be placed in the scene model.

A 3D scene model may be classified into two parts: first, all dynamic parts, and second all static parts. The dynamic part of the 3D scene model may be further sub-divided into separate parts, each representing objects (or parts of) an object in the scene model, that is, source volumes. The static parts of the scene model may include e.g. static room geometry (walls, ceiling, fixed furniture) and may be compressed either by known volumetric data compression solutions, or, similar to the dynamic part, sub-divided into individual objects for projection-based compression as described earlier, to be encoded into the bitstream.

In an example, some objects may be a chair (static), a television screen (static geometry, dynamic texture), a moving person (dynamic). For each object, a suitable projection geometry (surface) may be found, e.g. cube projection to represent the chair, another cube for the screen, a cylinder for the person's torso, a sphere for a detailed representation of the person's head, and so on. The 3D data of each object may then be projected onto the respective projection surface and 2D planes are derived by "unfolding" the projections from three dimensions to two dimensions (plane). The unfolded planes will have several channels, typically three for the colour representation of the texture, e.g. RGB, YUV, and one additional plane for the geometry (depth) of each projected point for later reconstruction.

Frame packing may be defined to comprise arranging more than one input picture, which may be referred to as (input) constituent frames, into an output picture. In general, frame packing is not limited to any particular type of constituent frames or the constituent frames need not have a particular relation with each other. In many cases, frame packing is used for arranging constituent frames of a stereoscopic video clip into a single picture sequence. The arranging may include placing the input pictures in spatially non-overlapping areas within the output picture. For example, in a side-by-side arrangement, two input pictures are placed within an output picture horizontally adjacently to each other. The arranging may also include partitioning of one or more input pictures into two or more constituent frame partitions and placing the constituent frame partitions in spatially non-overlapping areas within the output picture. The output picture or a sequence of frame-packed output pictures may be encoded into a bitstream e.g. by a video encoder. The bitstream may be decoded e.g. by a video decoder. The decoder or a post-processing operation after decoding may extract the decoded constituent frames from the decoded picture(s) e.g. for displaying.

A standard 2D video encoder may then receive the planes as inputs, either as individual layers per object, or as a frame-packed representation of all objects. The texture picture may thus comprise a plurality of projections of texture data from further source volumes and the geometry picture may represent a plurality of mappings of projection surfaces to the source volume.

For each object, additional information may be signalled to allow for reconstruction at the decoder side:
 in the case of a frame-packed representation: separation boundaries may be signaled to recreate the individual planes for each object,
 in the case of projection-based compression of static content: classification of each object as static/dynamic may be signaled,
 relevant data to create real-world geometry data from the decoded (quantised) geometry channel(s), e.g. quantisation method, depth ranges, bit depth, etc. may be signaled,
 initial state of each object: geometry shape, location, orientation, size may be signaled,
 temporal changes for each object, either as changes to the initial state on a per-picture level, or as a function of time may be signaled, and
 nature of any additional auxiliary data may be signaled.

For the described example above, signaling may, for example, be as follows:

```
NUM_OBJECTS       4     // folding-chair, TV, person body,
                              person head
FRAME_PACKED      0     // individual inputs
for i=0:NUM_OBJECTS    // initial states for each projection
    PROJ_GEO              // geometry, e.g. 0: cube, 1: cylinder,
                              2: sphere, ...
    PROJ_CENTER_X/Y/Z    // projection centre in real world
                              coordinates
    PROJ_SIZE_X/Y/Z      // projection dimensions in real world
                              units
    PROJ_ROTATION_X/Y/Z  // projection orientation
    PROJ_STATUS          // 0: dynamic 1:static
    DEPTH_QUANT          // depth quantisation, i.e. 0 for
                              linear, ...
    DEPTH_MIN            // minimum depth in real world units
    DEPTH_MAX            // maximum depth in real world units
end
for n=0:NUM_FRAMES
    for i=0:NUM_OBJECTS
        CHANGE       1   // i.e. 0=static, 1=translation,
                              2=trans+rotation, ...
        TRANS_VEC        // translation vector
        ...              // relevant data to represent change
    end
end
```

The decoder may receive the static 3D scene model data together with the video bitstreams representing the dynamic parts of the scene model. Based on the signalled information on the projection geometries, each object may be reconstructed in 3D space and the decoded scene model is created by fusing all reconstructed parts (objects or source volumes) together.

As volumetric video compression currently suffers from poor temporal compression performance, it has been noticed that this projecting of volumetric models onto 2D planes allows for using standard 2D video coding tools with efficient temporal compression. Thus, coding efficiency may be increased.

Using source volume projections onto projection surfaces instead of prior-art 2D-video based approaches, i.e. multi-view and depth approaches, may provide better coverage of the scene model (or object). Thus, it has been noticed that 6DOF capabilities may be improved. Using several projection surface geometries for individual objects may improve the coverage of the scene model even further. Furthermore, standard video encoding hardware may be utilized for real-time compression/decompression of the projection surfaces (that have been unfolded onto planes). The projection and reverse projection steps may be of low complexity.

Performance tests have shown improvements in coding efficiency compared to currently known volumetric data compression solutions. Following the measurement procedure laid out in the ISO/IEC JTC1/SC29/WG11 (MPEG) Call for Proposals for Point Cloud Compression V2 [ISO/IEC JTC1/SC29/WG11 MPEG2017/N16763], required bit rates could be reduced by 86% with respect to point-to-point geometry distortion, 76% with respect to point-to-plane geometry distortion and 53% with respect to YUV colour distortion.

Simple objects might suffice to be projected and coded with a single projection. Complex objects or larger scene models may require several (different) projections. The projection geometry may remain constant over a volumetric video sequence, but the location and orientation of the projection surfaces in space can change (and can be possibly be predicted in the encoding, wherein the difference from the prediction is encoded).

Depth may be coded "outside-in" (indicating the distance from the projection surface to the coded point), or "inside-out" (indicating the distance from the projection center point or axis to the coded point). In inside-out coding, depth of each projected point may be positive (with positive distance PD1) or negative (with negative distance ND2). As shown in FIG. 5c, the center of projection cylinder or sphere may fall outside of the 3D object OBJ1, especially when the object is concave. In this case, two surfaces may be projected on one side of the cylinder (P1), so the inner surface is occluded by the outer surface. However, the other side of the cylinder projection is empty and the inner content may be projected onto the other side of the cylinder (P2). As a result, more content of the 3D object may be mapped to the cylinder projection, using negative depth information ND2. Therefore, in the projection with negative depth ND2, there may be projected information in places where there otherwise would not be. This may enable the object to be reconstructed better.

Figure 6A:
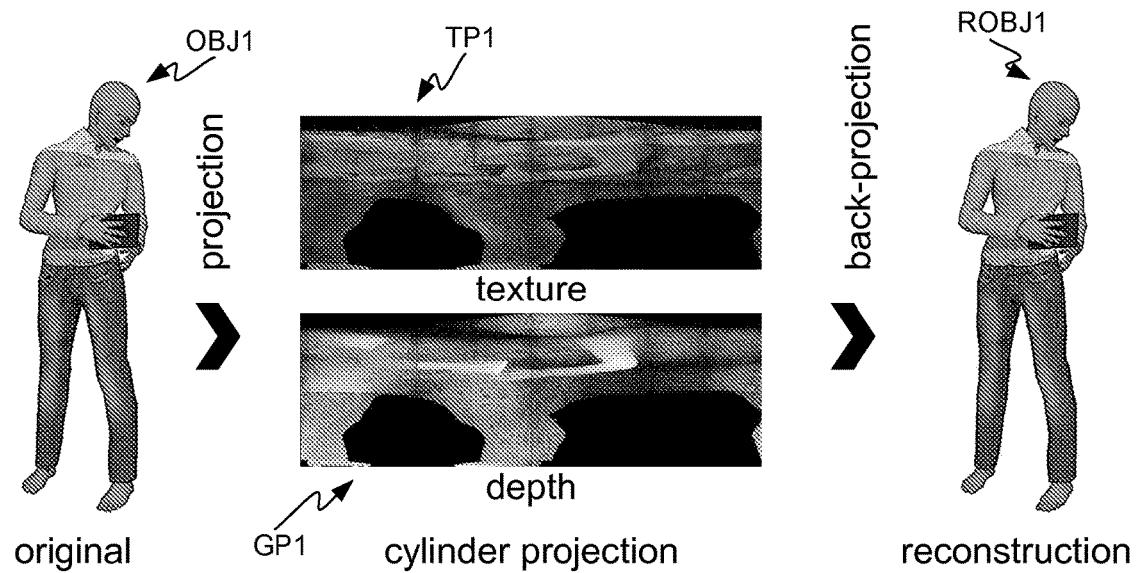
FIGS. 6a and 6b show a projection of a source volume to a projection surface, and inpainting of a sparse projection.
Figure 6B:
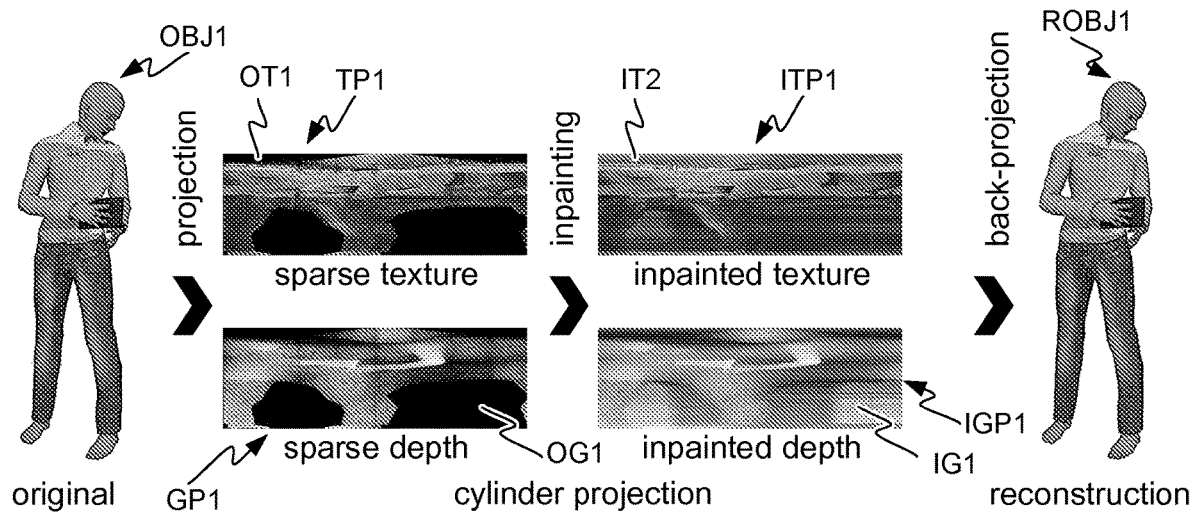

A negative depth projection may be described in the following steps:
 project all points onto a projection surface, e.g. cylinder,
 position the "unfolded" cylinder onto image plane
 check for each x,y position of image plane if it has multiple points of the source volume assigned to it OR alternatively compare radius of a point to its neighboring points neighborhood to see if point is part of the same surface,
 keep the point with the largest radius,
 try to write the point with the smallest radius to the "opposite" side (180 degree shift), only if there is no point already mapped onto the opposite side FIGS. 6a and 6b show a projection of a source volume to a projection surface, and inpainting of a sparse projection. A three-dimensional (3D) scene model, represented as objects OBJ1 comprising geometry primitives such as mesh elements, points, and/or voxel, may be projected onto one, or more, projection surfaces, as described earlier. As shown in FIG. 6a, these projection surface geometries may be "unfolded" onto 2D planes (two planes per projected source volume: one for texture TP1, one for depth GP1), which may then be encoded using standard 2D video compression technologies. Relevant projection geometry information may be transmitted alongside the encoded video files to the decoder. The decoder may then decode the video and performs the inverse projection to regenerate the 3D scene model object ROBJ1 in any desired representation format, which may be different from the starting format e.g. reconstructing a point cloud from original mesh model data.

In addition to the texture picture and geometry picture shown in FIG. 6a, one or more auxiliary pictures related to one or more said texture pictures and the pixels thereof may be encoded into or along the bitstream. The auxiliary pictures may e.g. represent texture surface properties related to one or more of the source volumes. Such texture surface properties may be e.g. surface normal information (e.g. with respect to the projection direction), reflectance and opacity (e.g. an alpha channel value). An encoder may encode, in or along the bitstream, indication(s) of the type(s) of texture surface properties represented by the auxiliary pictures, and a decoder may decode, from or along the bitstream, indication(s) of the type(s) of texture surface properties represented by the auxiliary pictures.

Mechanisms to represent an auxiliary picture may include but are not limited to the following:

A color component sample array, such as a chroma sample array, of the geometry picture.

An additional sample array in addition to the conventional three color component sample arrays of the texture picture or the geometry picture.

A constituent frame of a frame-packed picture that may also comprise texture picture(s) and/or geometry picture(s).

An auxiliary picture included in specific data units in the bitstream. For example, the Advanced Video Coding (H.264/AVC) standard specifies a network abstraction layer (NAL) unit for a coded slice of an auxiliary coded picture without partitioning.

An auxiliary picture layer within a layered bitstream. For example, the High Efficiency Video Coding (HEVC) standard comprises the feature of including auxiliary picture layers in the bitstream. An auxiliary picture layer comprises auxiliary pictures.

An auxiliary picture bitstream separate from the bitstream(s) for the texture picture(s) and geometry picture(s). The auxiliary picture bitstream may be indicated, for example in a container file, to be associated with the bitstream(s) for the texture pictures(s) and geometry picture(s).

The mechanism(s) to be used for auxiliary pictures may be pre-defined e.g. in a coding standard, or the mechanism(s) may be selected e.g. by an encoder and indicated in or along the bitstream. The decoder may decode the mechanism(s) used for auxiliary pictures from or along the bitstream.

The projection surface of a source volume may encompass the source volume, and there may be a model of an object in that source volume. Encompassing may be understood so that the object (model) is inside the surface such that when looking from the center axis or center point of the surface, the object's points are closer to the center than the points of the projection surface are. The model may be made of geometry primitives, as described. The geometry primitives of the model may be projected onto the projection surface to obtain projected pixels of the texture picture. This projection may happen from inside-out. Alternatively or in addition, the projection may happen from outside-in.

Projecting 3D data onto 2D planes is independent from the 3D scene model representation format. There exist several approaches for projecting 3D data onto 2D planes, with the respective signalling. For example, there exist several mappings from spherical coordinates to planar coordinates, known from map projections of the globe, and the type and parameters of such projection may be signaled. For cylindrical projections, the aspect ratio of height and width may be signaled.

FIG. 6b illustrates inpainting, where sparsity in the original texture and depth projections (left) are reduced by inpainting or filtering (right). The 3D to 2D projections may cause sparse data OT1, OG1 in the projection pictures TP1, GP1, and such data is challenging to encode efficiently. The sparsity may be reduced by choosing appropriate geometry e.g. by rate distortion decision. The geometry choice affects the number of missing pixels and this may be used as a criterion for choosing the geometry. The remaining sparse values may be inpainted, that is, values may be created for such pixels by using values of the surrounding pixels through interpolation and/or filtering to obtain inpainted texture picture ITP1 and geometry picture IGP1. Such inpainted values IT1, IG1 would create new 3D points in the reconstruction, but these would lie on the object surface and thus they don't pose a problem. A specific depth value, e.g. 0, or a specific depth value range may be reserved to indicate that a pixel is inpainted and not present in the source material. The specific depth value or the specific depth value range may be pre-defined for example in a standard, or the specific depth value or the specific depth value range may be encoded into or along the bitstream and/or may be decoded from or along the bitstream. Additional 3D filtering may be applied to remove unnecessary points and to close surface holes due to points missing from the projection. For example, excess points co-locating in the same position in a quantized grid or close by in floating point values may be removed. Colour values of neighbouring points may be averaged. Points with no neighbor points may be removed.

Lost 3D points, due to occlusions, and/or limited projection precision (=low resolution of 2D plane). Such points could be covered with additional projections.

Figure 7A:
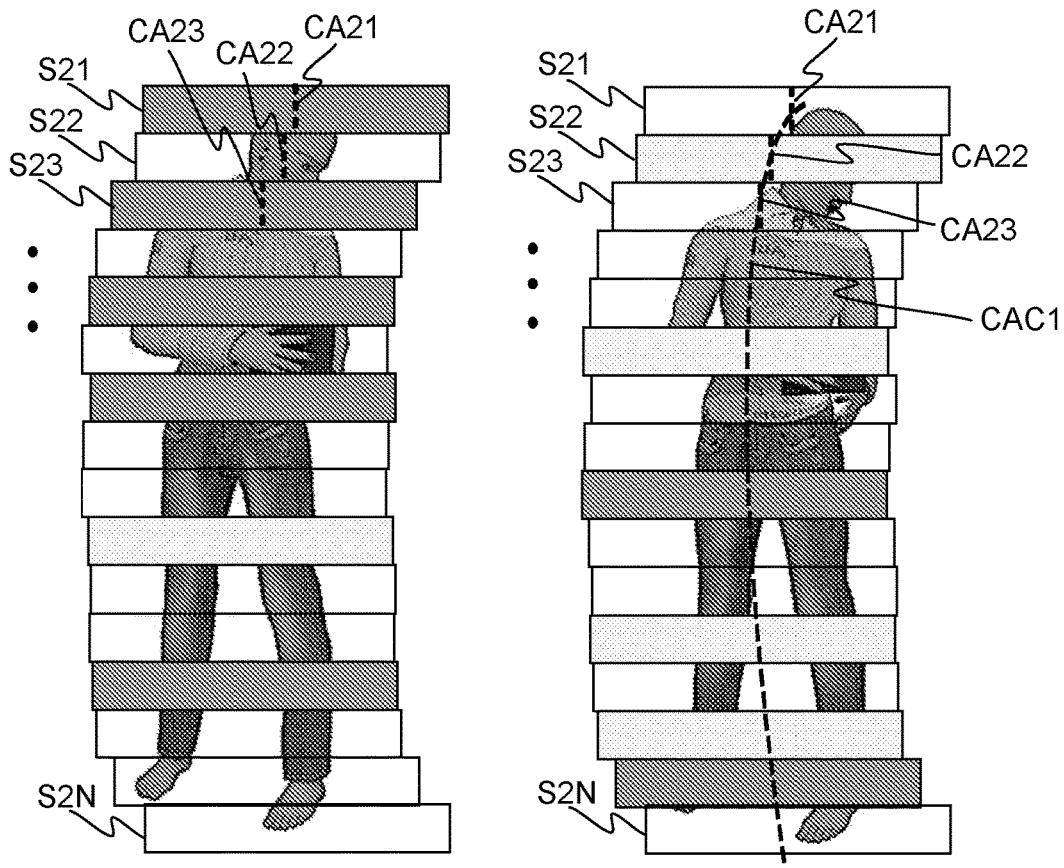
FIGS. 7a and 7b show a segmented geometry projection and a skeleton geometry projection.
Figure 7B:
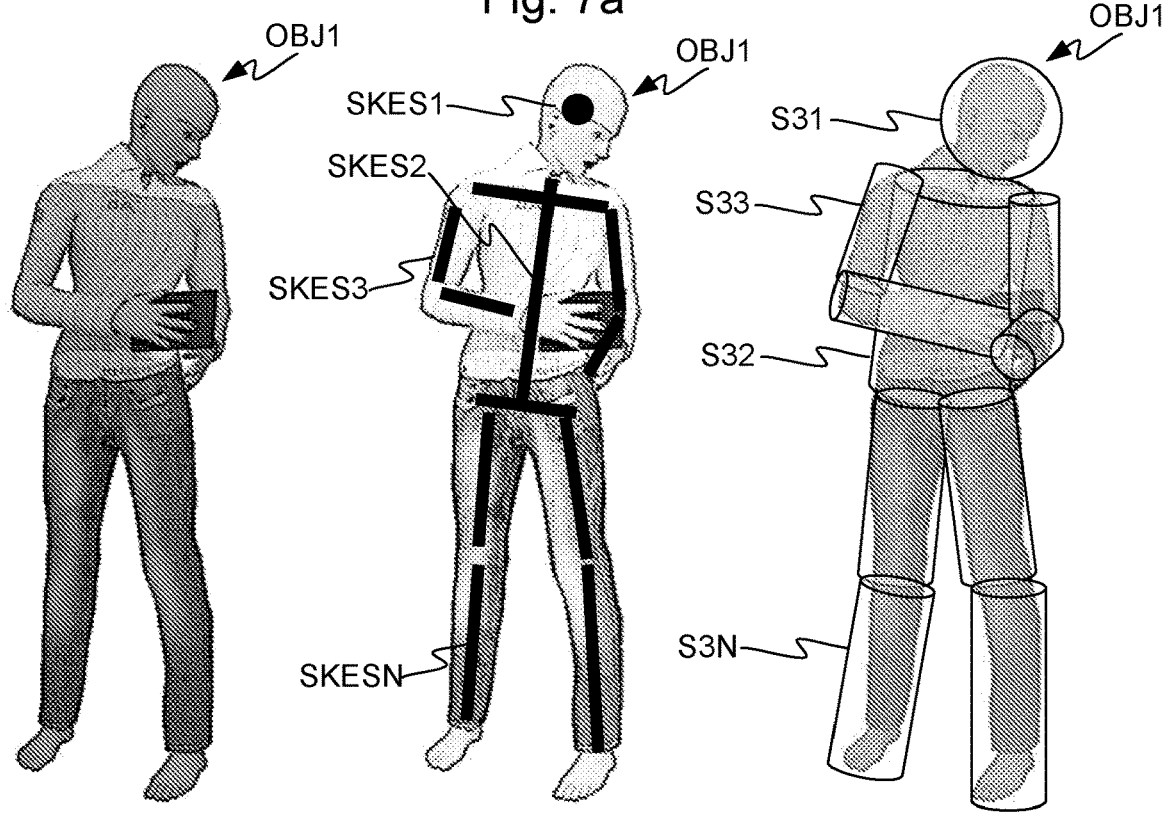

FIGS. 7a and 7b show a segmented geometry projection and a skeleton geometry projection.

A segmented geometry projection approach may exploit volumetric scene model content characteristics to simplify the selection and signaling of projection geometry properties. Instead of various projection geometries, distributed over the 3D video volume, a single projection surface, such as a cylinder, may be chosen e.g. for an individual source volume. The projection surface, such as the cylinder, may be sub-divided (segmented) to follow the object geometry more closely, as shown in FIG. 7a. A single texture video and depth video may encoded, with a few geometry properties, e.g. cylinder radius and center location.

A single volumetric video object (source volume) may be represented by a series of projection segments of the same geometry. That is, if a person were represented with a cylinder or cube projection surface, each segment would represent a predefined part of this projection surface sliced across a predefined axis. Fundamental parameters of the projection may remain constant (geometry type, orientation, size, overall position in space), however, the respective centre of each projection may change.

FIG. 7a illustrates such a segmentation for cylinder projection, where every rectangle represents an individual cylinder projection of the covered parts of the 3D object. The smaller segments may be able to follow the shape of an object better than a single overall projection shape, thus improving coverage of the object.

A texture picture may comprise a plurality of projections of texture data of segments of a source volume of the scene model, the projection being from the segment source volumes to a segment projection surfaces S21, S22, S23, . . . , S2N. The geometry picture may be created analogously. This segmented projection geometry information may be encoded into or along the bitstream, comprising information of position of the segmented projection surface in the scene model. The segments of the projection surfaces may be identical cylindrical surfaces with different center axes CA21, CA22, CA23, . . . , and the source volumes being cylinders stacked adjacent to each other, for example on top of each other. The center axes of the cylindrical surfaces may be line segments CA21, CA22, CA23, . . . that are of the same height as the cylinder and lie on the mathematical center axis of the cylinder. The stacking of the cylindrical surfaces may be arranged so that the center axes of the cylinders are parallel with each other, or so that some or all of the center axes are tilted (at an angle) with respect to each other, possibly causing overlap of the projection surfaces and source volumes. The orientation of the center axes may be encoded into or along the bitstream.

The segmented projection surface, e.g. a stack of cylinders, may be useful in getting the center point of the projection surface to fall inside the object to be projected, perhaps even so that the center matches the model's center well. This may make the projection more efficient and improve the quality as more points may be projected. Especially for smaller objects, filling the projection surface is more heavy, because one point may only create one pixel (point to pixel projection), and adjusting the center of the projection surface may be useful.

In FIG. 7b, the position of the center axis has been defined with the help of a spatial curve function CAC1, e.g. a polynomial. Coding parameters of such curve may be more efficient than coding the center axis locations of each segment. For example, a segmented cylinder may be created by creating a stack of cylinders, calculating the center of mass of the projection volume to determine the optimal center point, possibly by fitting a function to the determined center points, and then performing the projection according to the (function-given) centers. The use of a fitted function for determining the center points may yield coding efficiency to transmitting the stack.

For the described example, signaling may be as follows:

```
for i=0:NUM_OBJECTS
    ...                     // previous geometry signalling for overall
                            geometry
    SEGMENTATION 2          // 0: no segmentation, 1: along X-axis, 2:
                            Y-axis, 3: Z-axis
    SEG_NUM                 // number of segments
    SEG_STEP                // segmentation step, e.g. 8 pixel for CU
                            alignment
    SEG_CENTER_X/Y_P0       // n parameters of polynomial function
                            describing centre changes
    ...
    SEG_CENTER_X/Y_PN
end
```

In the following, exemplary phases and properties of segmented projection encoding for a point cloud are given:
1. Divide point cloud along primary axis (longest axis) into smaller "subclouds"
2. Each subcloud may have an individual center for cylinder projection
   Center coordinates can be encoded as polynomial function
   Further subdivision of the segments may be carried out
   Cylinder height may be aligned with coding unit height of the picture to be encoded,
   Cylinder radius may affect quality & file size (rate distortion decision may be applied here to find the optimal cylinder radius)
3. Project cylinders individually
   Occlusion detection (only keep outmost points)
   "negative radius": try to project occluded points at the opposite side
4. Form individual single frames for texture and depth
5. Interpolate missing values
6. Optional: Repeat 1-5 along different axis to cover occlusions
7. Encode texture and depth information A skeletal volumetric video object may be understood as a volumetric video object (point cloud, meshes, voxel), that can be approximated by an underlying skeleton. A skeleton can be understood to be a structure of interconnected segments that lies essentially centrally inside an object's outer surface in the respective parts. Typically, such objects comprise humans and animals. Such models may either be predefined or derived from the original object by analysis tools. Projection geometry subdivision and parameters are then derived from this skeletal model. Skeletal projection surfaces for an object may be understood as a predefined collection of connected simple shapes, where the simple shapes can move/rotate in relation to each other. The simple shapes can have center axes, and these center axes can be the described interconnected segments. For example, a cylindrical projection surface may have a center axis (the skeleton segment) that has the height of the cylinder. This skeleton segment therefore defines the cut point/line, that is, in this case the height, of the projection surface. Two projection surfaces may be defined by interconnected skeletal segments being the center axes of the surfaces.

There exist several solutions to derive a simplified underlying skeleton from images (with or without depth information), for example: acquiring human skeleton proportions from monocular images without posture estimation, or using 2D silhouette and 3D skeletal models for human shape detection and tracking. A best matching skeleton may be chosen among a number of different skeletons.

As shown in FIG. 7b, such a skeleton can be taken as the starting point to separate a volumetric video object OBJ1 into sub-geometries (projection surfaces) for projection, e.g. a sphere S31 for the head, cylinder for torso S32, two cylinders (e.g. S33, S3N) per arm and leg. The center points or center axes of the surfaces may be given by the skeleton parts SKES1, SKES2, SKES3, SKES, respectively (a center point may be considered as a zero-length center axis). As the anatomy of a human or animal object typically does not change during the video sequence (except in some extreme genres), these geometries may remain constant over the video sequence and only the change of position and orientation may need to be signaled.

A simple skeleton-based object with at least two parts could be described as follows (naturally, skeletons may comprise more than two parts): a first projection surface S31 and a second projection surface S32 have first and second center axes SKES1, SKES2, said first and second center axes defining an extent of said first and second projection surfaces and respectively, and the first and second center axes are connected to each other at one end in a skeleton structure, and the first and second source volumes are adjacent to each other. As is clear, the volumes and surfaces may be partially overlapping at the end regions where the parts are connected to each other, or there may be no overlap.

Information on sub-division of one or more source volumes and respective changes in one or more projection surfaces may be encoded into or along the bitstream. This may be done with respect to the skeleton model, that is, positions of the parts of the skeleton model may be encoded into or along the bitstream.

For the described example, signalling could look like this:

```
for i=0:NUM_OBJECTS
    ...                    // previous geometry signalling for overall
                           geometry
    SKELETON 1             // 0: off, 1: on
    MODEL_PARA0...N        // skeleton model parameters
end
```

Sub-division may improve the coverage of the volumetric video object. As anatomy typically does not change, these geometries may remain constant over the video sequence and only change position and orientation, where (both may be easily signalled). As the skeleton may remain fairly fixed in topology sense, encoding of the volumetric video object may become efficient. This method may efficiently divide a volumetric video object into sub-geometries for projection-based volumetric video compression.

Figure 8A:
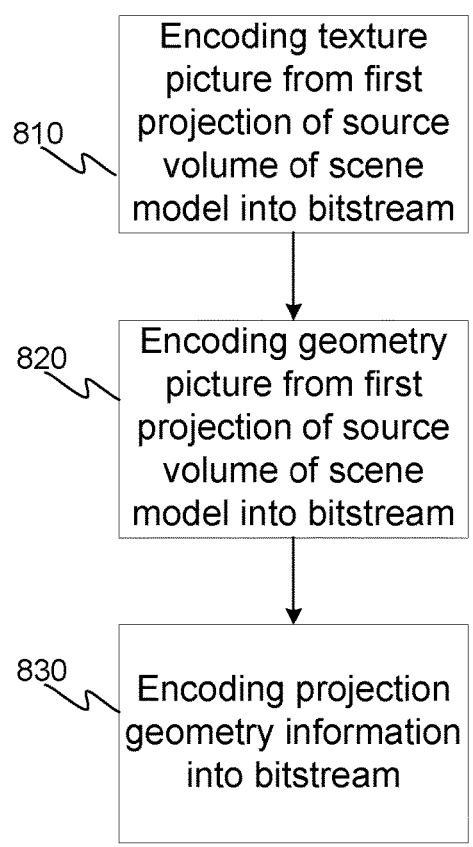
FIGS. 8a and 8b show flow charts for encoding and decoding of a three-dimensional scene.
Figure 8B:
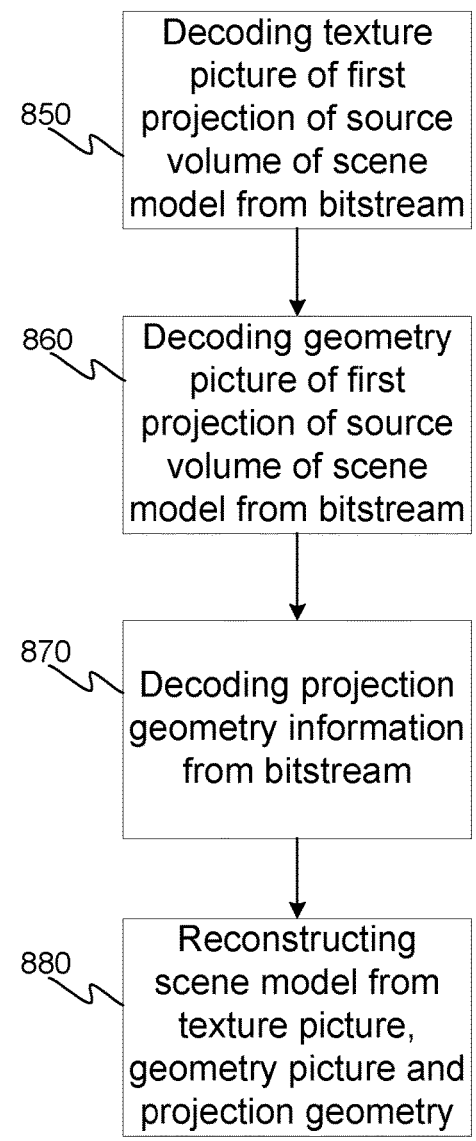

FIGS. 8a and 8b show flow charts for encoding and decoding of a three-dimensional scene model.

In the encoding, in phase 810, a texture picture may be encoded into a bitstream. The texture picture may comprise a projection of texture data of a source volume of a digital scene model, as described earlier. The projection may be computed from this source volume to a projection surface in a manner described earlier. The scene model may comprise a number of further source volumes, and these further source volumes may be projected and encoded into or along the bitstream, as well.

In phase 820, a first geometry picture may be encoded into the bitstream, and the geometry picture may represent a mapping of the projection surface to the source volume. That is, as described earlier, the geometry primitives in the object model of the source volume are projected, and the geometry picture describes this projection, e.g. by giving depth information from the projection surface into the source volume.

In phase 830, projection geometry information of the projection may be encoded into the bitstream. This projection geometry information may comprise information of the position of the projection surface in the scene model.

In the decoding, in phase 850, a texture picture may be decoded from a bitstream to obtain decoded texture data. The texture picture may comprise a projection of texture data of a source volume of a digital scene model. This projection may be from a source volume to a projection surface. The scene model may comprising a number of further source volumes and the texture data for these may be decoded from the bitstream, as well.

In phase 860, a first geometry picture may be decoded from the bitstream to obtain decoded scene geometry data. This geometry picture may represent a mapping of the projection surface to the source volume (which is called the destination volume at the decoder).

In phase 870, projection geometry information of the projection may be decoded from the bitstream. The projection geometry information may comprise information of position of the first projection surface in the scene model to be reconstructed.

In phase 880, a reconstructed scene model may be computed by projecting the decoded texture data to a destination volume (corresponding to the source volume at the encoder) using the decoded scene geometry data and the projection geometry information. This reconstructed scene model may then be used or computing an image frame of the scene model to be displayed to the user, as described earlier. Such an image frame may be a stereo viewing image frame (a pair of images).

In the above, some embodiments have been described with reference to encoding. It needs to be understood that said encoding may comprise one or more of the following: encoding source image data into a bitstream, encapsulating the encoded bitstream in a container file and/or in packet(s) or stream(s) of a communication protocol, and announcing or describing the bitstream in a content description, such as the Media Presentation Description (MPD) of ISO/IEC 23009-1 (known as MPEG-DASH) or the IETF Session Description Protocol (SDP). Similarly, some embodiments have been described with reference to decoding. It needs to be understood that said decoding may comprise one or more of the following: decoding image data from a bitstream, decapsulating the bitstream from a container file and/or from packet(s) or stream(s) of a communication protocol, and parsing a content description of the bitstream, In the above, some embodiments have been described with reference to encoding or decoding texture pictures, geometry pictures and projection geometry information into or from a single bitstream. It needs to be understood that embodiments can be similarly realized when encoding or decoding texture pictures, geometry pictures and projection geometry information into or from several bitstreams that are associated with each other, e.g. by metadata in a container file or media presentation description for streaming.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

It is clear that the present invention is not limited solely to the above-presented embodiments, but it can be modified within the scope of the appended claims.

The invention claimed is:

1. A method, comprising:
   encoding a first texture picture into a bitstream, said first texture picture comprising a first projection of texture data of a first source volume of a scene model to a first projection surface, said scene model comprising a number of further source volumes;
   encoding a first geometry picture into said bitstream, said first geometry picture comprising a mapping of said first projection surface to said first source volume; and
   encoding a first projection geometry information of said first projection into said bitstream, said first projection geometry information comprising information of a position of said first projection surface in said scene model.

2. A method, comprising:
decoding a first texture picture from a bitstream to obtain first decoded texture data, said first texture picture comprising a first projection of texture data of a first source volume of a scene model to a first projection surface, said scene model comprising a number of further source volumes;
decoding a first geometry picture from said bitstream to obtain first decoded scene geometry data, said first geometry picture comprising a mapping of said first projection surface to said first source volume;
decoding first projection geometry information of said first projection from said bitstream, said first projection geometry information comprising information of a position of said first projection surface in said scene model; and
computing a reconstructed scene model based on projecting said first decoded texture data to a first destination volume using said first decoded scene geometry data and said first projection geometry information.

3. An apparatus comprising:
at least one processor; and
at least one non-transitory memory including computer program code;
the at least one memory and the computer program code configured to, with the at least one processor, cause the apparatus at least to perform:
encode a first texture picture into a bitstream, said first texture picture comprising a first projection of texture data of a first source volume of a scene model to a first projection surface, said scene model comprising a number of further source volumes;
encode a first geometry picture into said bitstream, said first geometry picture comprising a mapping of said first projection surface to said first source volume; and
encode a first projection geometry information of said first projection into said bitstream, said first projection geometry information comprising information of a position of said first projection surface in said scene model.

4. An apparatus according to claim 3, wherein the at least one memory and the computer program code are further configured to, with the at least one processor, cause the apparatus to:
encode a second texture picture into said bitstream, said second texture picture comprising a second projection of a texture data of a second source volume of said scene model to a second projection surface;
encode a second geometry picture into said bitstream, said second geometry picture comprising a mapping of said second projection surface to said second source volume; and
encode second projection geometry information of said second projection into said bitstream, said second projection geometry information comprising information of a position of said second projection surface in said scene model.

5. An apparatus according to claim 4, wherein said first texture picture and said second texture picture represent a same or substantially same time instance.

6. An apparatus according to claim 4, wherein:
said first projection surface and said second projection surface comprise first and second center axes, said first and second center axes defining an extent of said first and second projection surfaces and said first and second center axes being connected to each other at one end, and said first and second source volumes being adjacent to each other with partial or no overlap.

7. An apparatus according to claim 3, wherein said first texture picture comprises a third projection of texture data of a third source volume of said scene model to a third projection surface, and said first geometry picture further comprising a mapping of said third projection surface to said third source volume, wherein the at least one memory and the computer program code are further configured to, with the at least one processor, cause the apparatus to:
encode a third projection geometry information of said third projection into said bitstream, said third projection geometry information comprising information of a position of said third projection surface in said scene model, wherein said first projection surface and said third projection surface comprise identical or substantially identical cylindrical surfaces with different center axes, and said first and third source volumes comprise cylinders stacked adjacent to each other.

8. An apparatus according to claim 3, wherein the at least one memory and the computer program code are further configured to, with the at least one processor, cause the apparatus to:
encode a fourth texture picture into said bitstream, said fourth texture picture comprising a fourth projection of texture data of a fourth source volume of said scene model to a fourth projection surface;
encode a fourth geometry picture into said bitstream, said fourth geometry picture comprising a mapping of said fourth projection surface to said fourth source volume;
encode a fourth projection geometry information of said fourth projection into said bitstream, said fourth projection geometry information comprising information of a position of said fourth projection surface in said scene model; and
encode information into said bitstream comprising an indication that said fourth projection geometry information is static.

9. An apparatus according to claim 3, wherein at least one further projection surface corresponds to each of the number of further source volumes, wherein the at least one memory and the computer program code are further configured to, with the at least one processor, cause the apparatus to:
encode at least one of shape, size, location or orientation of one or more said projection surfaces into said bitstream with respect to coordinates of said scene model or said first source volume.

10. An apparatus according to claim 3, wherein at least one further projection surface corresponds to each of the number of further source volumes, wherein the at least one memory and the computer program code are further configured to, with the at least one processor, cause the apparatus to:
encode information on temporal changes in at least one of location, orientation or size of one or more said projection surfaces into said bitstream.

11. An apparatus according to claim 3, wherein at least one further projection surface corresponds to each of the number of further source volumes, wherein the at least one memory and the computer program code are further configured to, with the at least one processor, cause the apparatus to:

encode information on sub-division of one or more said further source volumes and respective changes in one or more said projection surfaces into said bitstream.

12. An apparatus according to claim 3, wherein at least one further texture picture corresponds to each of the number of further source volumes, wherein the at least one memory and the computer program code are further configured to, with the at least one processor, cause the apparatus to:

encode one or more auxiliary pictures related to one or more said texture pictures into said bitstream, said one or more auxiliary pictures comprising texture surface properties related to one or more of said further source volumes, said texture surface properties comprising one or more of surface normal, reflectance or opacity.

13. An apparatus according to claim 3, wherein said first projection surface encompasses said first source volume, said first source volume comprising a first object model of a first object, said first object model comprising first geometry primitives, wherein the at least one memory and the computer program code are further configured to, with the at least one processor, cause the apparatus to:

project said first geometry primitives of said first object model onto said first projection surface to obtain first projected pixels of said first texture picture; and determine geometry data of said first projection from said first source volume to said first projection surface to obtain first geometry pixels of said first geometry picture.

14. An apparatus according to claim 3, wherein said first texture picture comprises a plurality of projections of texture data from the number of further source volumes and said first geometry picture comprises a plurality of mappings of projection surfaces to said first source volume.

15. An apparatus according to claim 3, wherein the at least one memory and the computer program code are further configured to, with the at least one processor, cause the apparatus to:

output said bitstream to be provided to a decoder.

16. An apparatus comprising:

at least one processor; and at least one non-transitory memory including computer program code;

the at least one memory and the computer program code configured to, with the at least one processor, cause the apparatus at least to perform:

decode a first texture picture from a bitstream to obtain first decoded texture data, said first texture picture comprising a first projection of texture data of a first source volume of a scene model to a first projection surface, said scene model comprising a plurality of further source volumes;

decode a first geometry picture from said bitstream to obtain first decoded scene geometry data, said first geometry picture comprising a mapping of said first projection surface to said first source volume;

decode a first projection geometry information of said first projection from said bitstream, said first projection geometry information comprising information of a position of said first projection surface in said scene model; and compute a reconstructed scene model based on projecting said first decoded texture data to a first destination volume using said first decoded scene geometry data and said first projection geometry information.

17. An apparatus according to claim 16, wherein the at least one memory and the computer program code are further configured to, with the at least one processor, cause the apparatus to:

decode a second texture picture from said bitstream, said second texture picture comprising a second projection of a texture data of a second source volume of said scene model to a second projection surface;

decode a second geometry picture from said bitstream, said second geometry picture comprising a mapping of said second projection surface to said second source volume;

decode second projection geometry information of said second projection from said bitstream, said second projection geometry information comprising information of a position of said second projection surface in said scene model; and compute said reconstructed scene model based on further projecting said second decoded texture data to a second destination volume using said second decoded scene geometry data and said second projection geometry information.

18. An apparatus according to claim 16, wherein said first projection surface encompasses said first destination volume, and said first projection surface comprises first projected texture pixels obtained based on said first projection, wherein the at least one memory and the computer program code are further configured to, with the at least one processor, cause the apparatus to:

determine first geometry data of said first projection from said first source volume to said first projection surface based on using first geometry pixels of said first geometry picture;

project said first texture pixels from said projection surface to said first destination volume of said reconstructed scene model using said first geometry data to obtain a first reconstructed object model of a first object, said first reconstructed object model comprising first geometry primitives; and form an image frame of said reconstructed scene model for displaying said image frame to a user.

19. A system comprising at least one processor, nontransitory memory including computer program code, the memory and the computer program code configured to, with the at least one processor, cause the system to perform at least the following:

encode a first texture picture into a bitstream, said first texture picture comprising a first projection of texture data of a first source volume of a scene model to a first projection surface, said scene model comprising a number of further source volumes;

encode a first geometry picture into said bitstream, said first geometry picture comprising a mapping of said first projection surface to said first source volume, encode a first projection geometry information of said first projection into said bitstream, said first projection geometry information comprising information of a position of said first projection surface in said scene model;

decode said first texture picture from a bitstream to obtain first decoded texture data, decode said first geometry picture from said bitstream to obtain first decoded scene geometry data;

decode said first projection geometry information of said first projection from said bitstream; and compute a reconstructed scene model based on projecting said first decoded texture data to a first destination volume using said first decoded scene geometry data and said first decoded projection geometry information.

20. A system comprising at least one processor, non-transitory memory including computer program code, the memory and the computer program code configured to, with the at least one processor, cause the system to perform at least the following:

decode a first texture picture from a bitstream to obtain first decoded texture data, said first texture picture comprising a first projection of texture data of a first source volume of a scene model to a first projection surface, said scene model comprising a number of further source volumes;

decode a first geometry picture from said bitstream to obtain first decoded scene geometry data, said first geometry picture comprising a mapping of said first projection surface to said first source volume;

decode a first projection geometry information of said first projection from said bitstream, said first projection geometry information comprising information of a position of said first projection surface in said scene mode; and compute a reconstructed scene model based on projecting said first decoded texture data to a first destination volume using said first decoded scene geometry data and said first projection geometry information.

* * * * *